(12) United States Patent
Park et al.

(10) Patent No.: US 12,022,179 B2
(45) Date of Patent: Jun. 25, 2024

(54) ELECTRONIC DEVICE INCLUDING STRUCTURE THAT REDUCES VIBRATION IN CAMERA MODULE

(71) Applicant: SAMSUNG ELECTRONICS CO., LTD., Suwon-si (KR)

(72) Inventors: Chiyoung Park, Suwon-si (KR); Youngsoo Jang, Suwon-si (KR); Manho Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 116 days.

(21) Appl. No.: 17/897,229

(22) Filed: Aug. 29, 2022

(65) Prior Publication Data

US 2023/0135247 A1    May 4, 2023

Related U.S. Application Data

(63) Continuation of application No. PCT/KR2022/011781, filed on Aug. 8, 2022.

(30) Foreign Application Priority Data

Nov. 4, 2021  (KR) ........................ 10-2021-0150952
Dec. 13, 2021  (KR) ........................ 10-2021-0177572

(51) Int. Cl.
*H04N 23/55* (2023.01)
*H04M 1/02* (2006.01)
*H04N 23/51* (2023.01)

(52) U.S. Cl.
CPC .......... *H04N 23/55* (2023.01); *H04M 1/0216* (2013.01); *H04N 23/51* (2023.01)

(58) Field of Classification Search
CPC ........ H04N 23/55; H04N 23/51; H04N 23/57; H04M 1/0216; H04M 1/0245; H04M 1/0264

See application file for complete search history.

(56) References Cited

U.S. PATENT DOCUMENTS 8,442,393 B2  5/2013  Bang et al.
9,871,954 B2  1/2018  Eromaki
(Continued)

FOREIGN PATENT DOCUMENTS

EP           3862811 A1   8/2021
KR    10-2015-0127792 A  11/2015
(Continued)

OTHER PUBLICATIONS

International Search Report dated Nov. 23, 2022 for PCT/KR2022/011781.

*Primary Examiner* — Nicholas G Giles
(74) *Attorney, Agent, or Firm* — CANTOR COLBURN LLP

(57) ABSTRACT

An electronic device includes a first housing including a first surface and a second surface; a second housing including a third surface and a fourth surface; a hinge structure; a camera module disposed within the first housing; and a first magnet disposed within the second housing and facing the camera module. The camera module includes: a case including one surface facing the first surface and the another surface facing the second surface and spaced apart from the first surface; a lens assembly movable within the case; and an actuator accommodating a second magnet and including a carrier configured to move the lens assembly in a direction toward the one surface of the case or a direction toward the other surface of the case; and the first magnet limits the movement of the lens assembly by interaction with the second magnet when the electronic device is in the folding state.

20 Claims, 13 Drawing Sheets

(56) References Cited

U.S. PATENT DOCUMENTS

| | | | |
|---|---|---|---|
| 11,496,664 B2* | 11/2022 | Platner | ................ H04M 1/0245 |
| 2019/0171252 A1 | 6/2019 | Hu | |
| 2020/0267861 A1 | 8/2020 | Kim | |
| 2020/0329178 A1 | 10/2020 | Moon et al. | |
| 2021/0208362 A1 | 7/2021 | Kim et al. | |
| 2022/0159170 A1* | 5/2022 | Platner | .................. G06F 1/1626 |

FOREIGN PATENT DOCUMENTS

| | | |
|---|---|---|
| KR | 10-2018-0053180 A | 5/2018 |
| KR | 10-2019-0080760 A | 7/2019 |
| KR | 20190139011 A | 12/2019 |
| KR | 20200038088 A | 4/2020 |
| KR | 20200101791 A | 8/2020 |
| KR | 20200119639 A | 10/2020 |

* cited by examiner

ELECTRONIC DEVICE INCLUDING STRUCTURE THAT REDUCES VIBRATION IN CAMERA MODULE

CROSS-REFERENCE TO RELATED APPLICATION(S)

This application is based on and claims priority under 35 U.S.C. § 120 to PCT International Application No. PCT/KR2022/011781, which was filed on Aug. 8, 2022, and claims priority to Korean Patent Application Nos. 10-2021-0150952 and 10-2021-0177572, filed on Nov. 4, 2021, and Dec. 13, 2021, respectively, in the Korean Intellectual Property Office, the disclosure of which are incorporated by reference herein their entirety.

BACKGROUND

Technical Field

Various embodiments relate to an electronic device including a structure that reduces vibration in the camera module.

Description of Related Art

In response to a user's request that an electronic device be equipped with various functions, the electronic device may include a camera. The camera may be disposed on various positions of the electronic device. For example, the camera may be disposed on the front of the electronic device in which a display is disposed, or may be embedded in the electronic device to face a rear facing the front.

The camera embedded in the electronic device may be mounted on a printed circuit board and manufactured in the form of a module, and may be equipped with an autofocus (AF) function and/or an image stabilization function for automatically adjusting focus of a lens included in the camera to deliver a clear image to the user.

SUMMARY

A camera module may implement an autofocus function and/or an image stabilization function by including an inner space in which a lens assembly is movable, and moving the lens assembly in the inner space as power is supplied. When power is not supplied to the camera module, the lens assembly may generate vibration by moving within the inner space as the user carries the electronic device. Due to the vibration generated by the lens assembly, noise may be generated in the camera module, or the lens assembly may be damaged.

Various embodiments may provide an electronic device including a structure that reduces vibration in the camera module.

The technical problems to be achieved in this document are not limited to those described above, and other technical problems not mentioned herein will be clearly understood by those having ordinary knowledge in the art to which the present disclosure belongs, from the following description.

According to an embodiment, an electronic device includes: a first housing including a first surface and a second surface opposite to the first surface and spaced apart from the first surface; a second housing including a third surface and a fourth surface opposite to the third surface and spaced apart from the third surface; a hinge structure transformable to an unfolding state in which a direction in which the first surface face and a direction in which the third surface faces are the same or to a folding state in which the first surface faces the third surface, by rotatably connecting the first housing and the second housing; a camera module disposed within the first housing; and a first magnet disposed within the second housing and facing the camera module when the electronic is in the folding state; wherein the camera module may include a case including one surface facing the first surface and another surface facing the second surface and spaced apart from the first surface; a lens assembly movable within the case; and an actuator accommodating a second magnet and including a first carrier configured to move the lens assembly in a direction toward the one surface of the case or a direction toward the another surface of the case; and wherein the first magnet may limit the movement of the lens assembly by interaction with the second magnet when the electronic device is in the folding state.

According to an embodiment, an electronic device includes: a first housing including a first surface and a second surface opposite to the first surface and spaced apart from the first surface; a second housing including a third surface and a fourth surface opposite to the third surface and spaced apart from the third surface; a hinge structure transformable to an unfolding state in which a direction in which the first surface face and a direction in which the third surface faces are the same or a folding state in which the first surface faces the third surface, by rotatably connecting the first housing and the second housing; a camera module disposed within the first housing; and a first magnet disposed within the second housing and facing the camera module when the electronic is in the folding state. The camera module includes: a case including one surface facing the first surface and another surface facing the second surface and spaced apart from the first surface; a lens assembly movable within the case; and an actuator including a first carrier accommodating a second magnet and configured to move the lens assembly in a direction toward the one surface of the case or a direction toward the other surface of the case, and a second carrier accommodating a third magnet and configured to move the lens assembly in a direction perpendicular to a direction from the one surface to the other surface; and wherein the first magnet may face the second magnet and limit the movement of the lens assembly by interacting with the second magnet when the electronic device is in the folding state.

According to an embodiment, the electronic device can prevent the lens assembly from generating vibration in the camera module by including a first magnet that limits movement of the lens assembly. By limiting the movement of the lens assembly, the electronic device according to an embodiment can prevent noise from being generated in the camera module, and the lens assembly from being damaged by vibration.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

Figure 1:
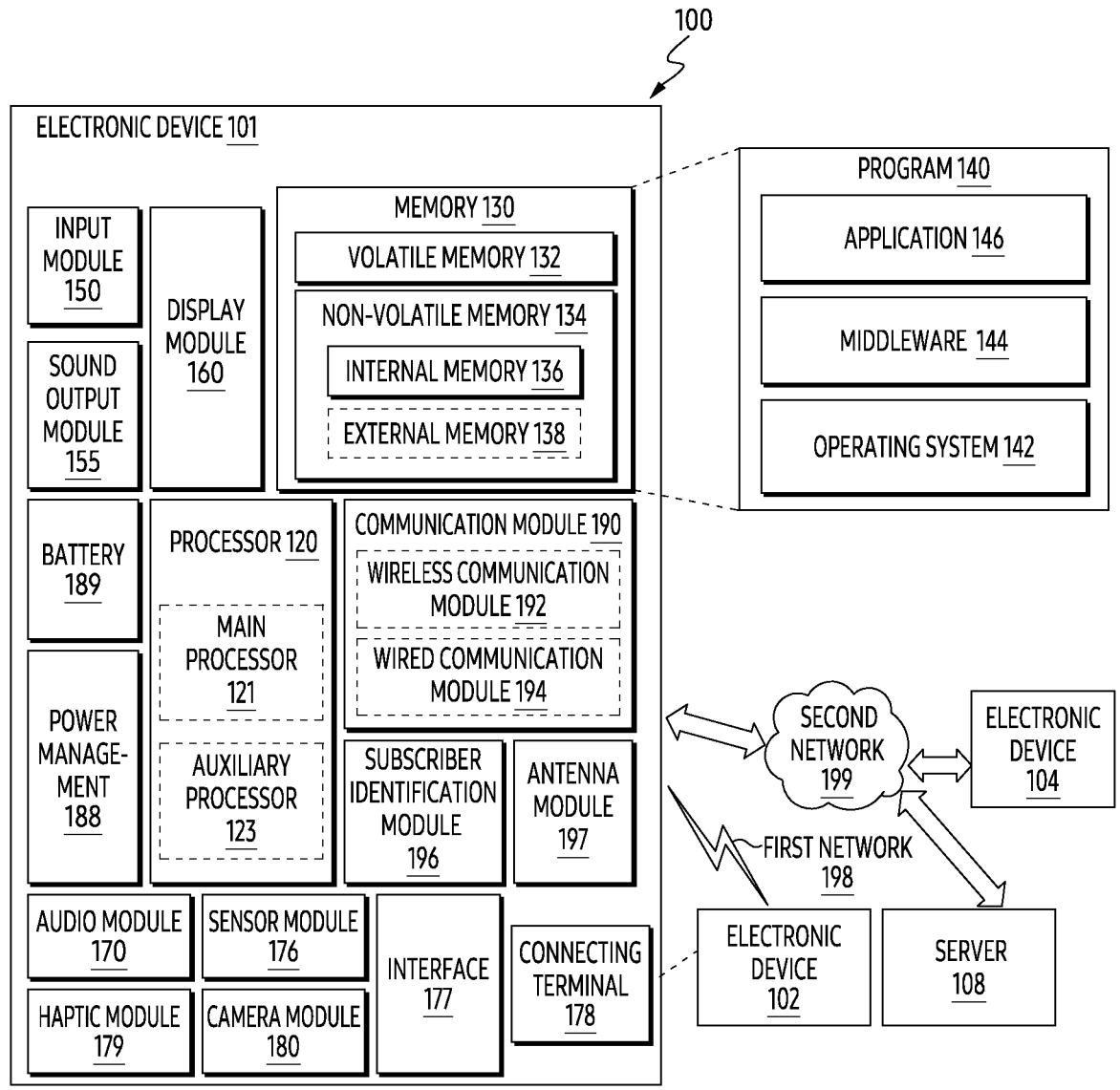
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
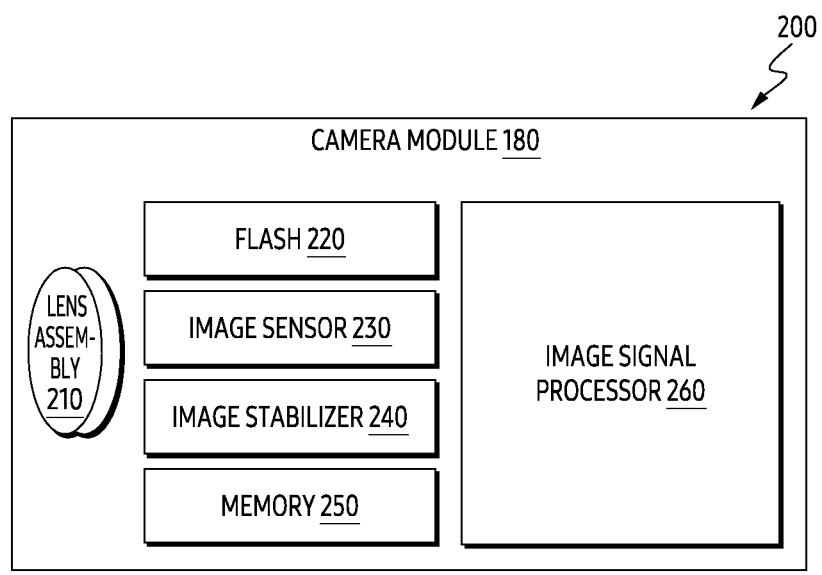
FIG. 2 is a block diagram illustrating a camera module according to an embodiment.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
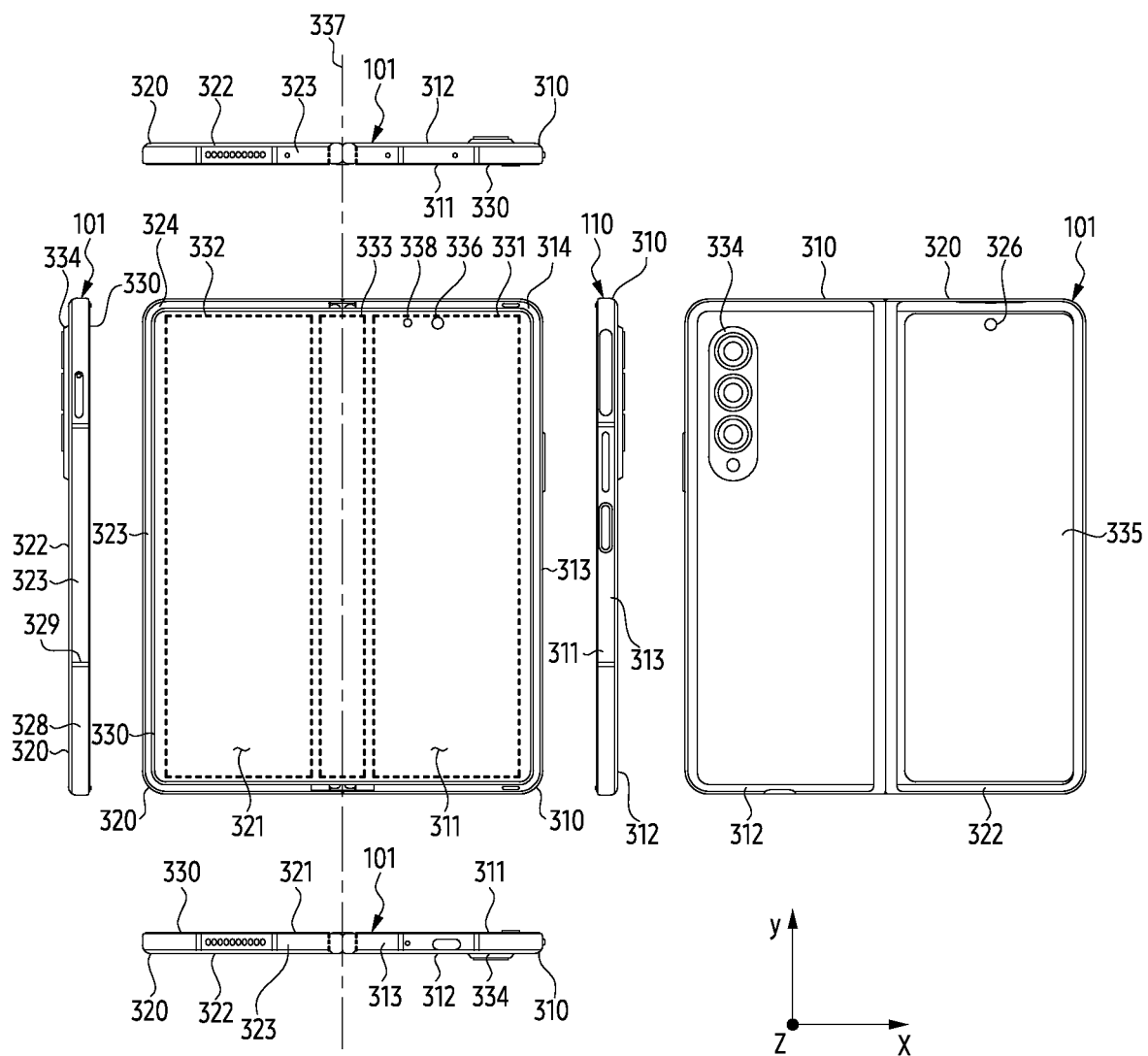
FIG. 3A illustrates an example of an unfolding state of an electronic device according to an embodiment.
Figure 3B:
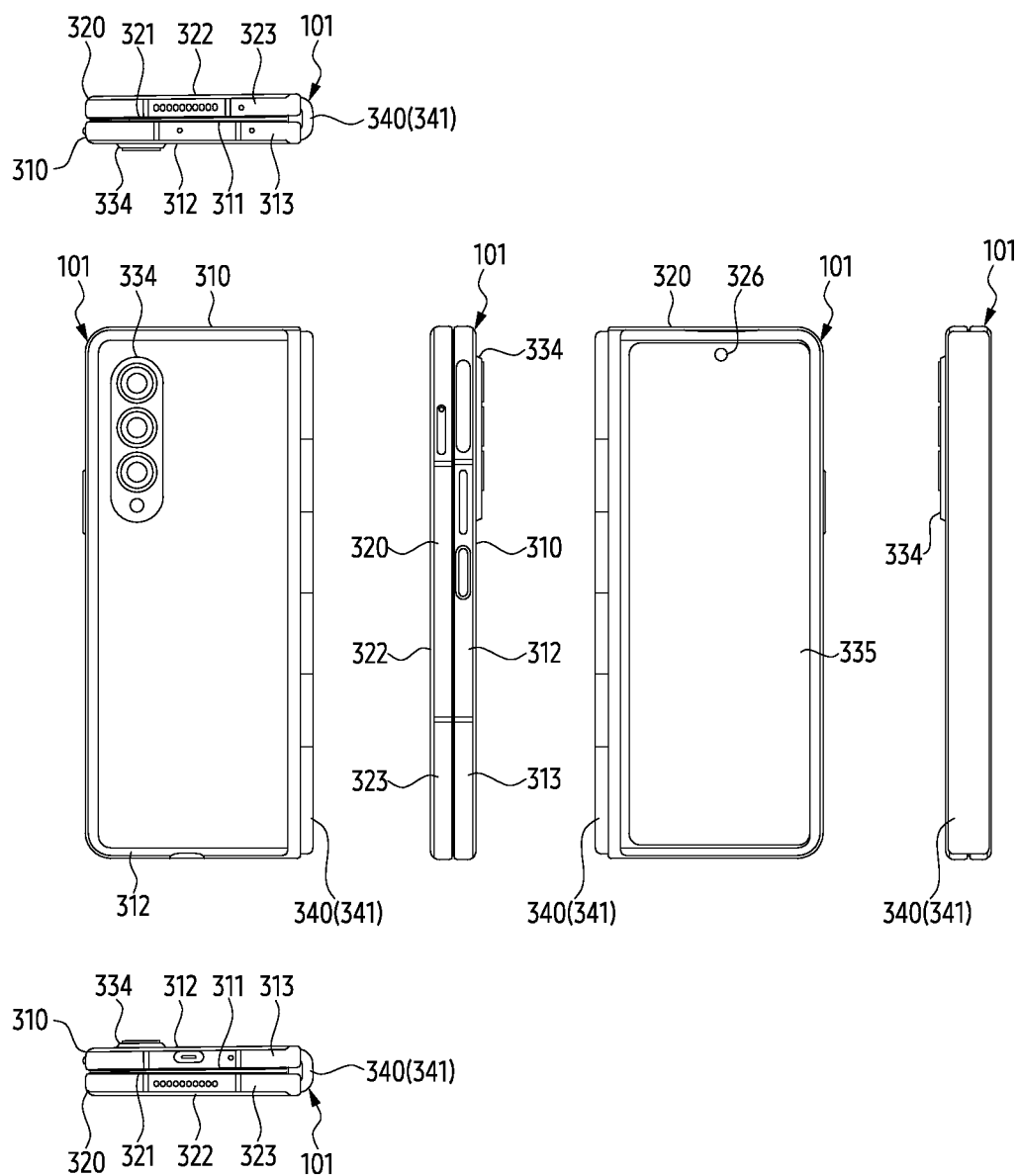
FIG. 3B illustrates an example of a folding state of an electronic device according to an embodiment.
Figure 3C:
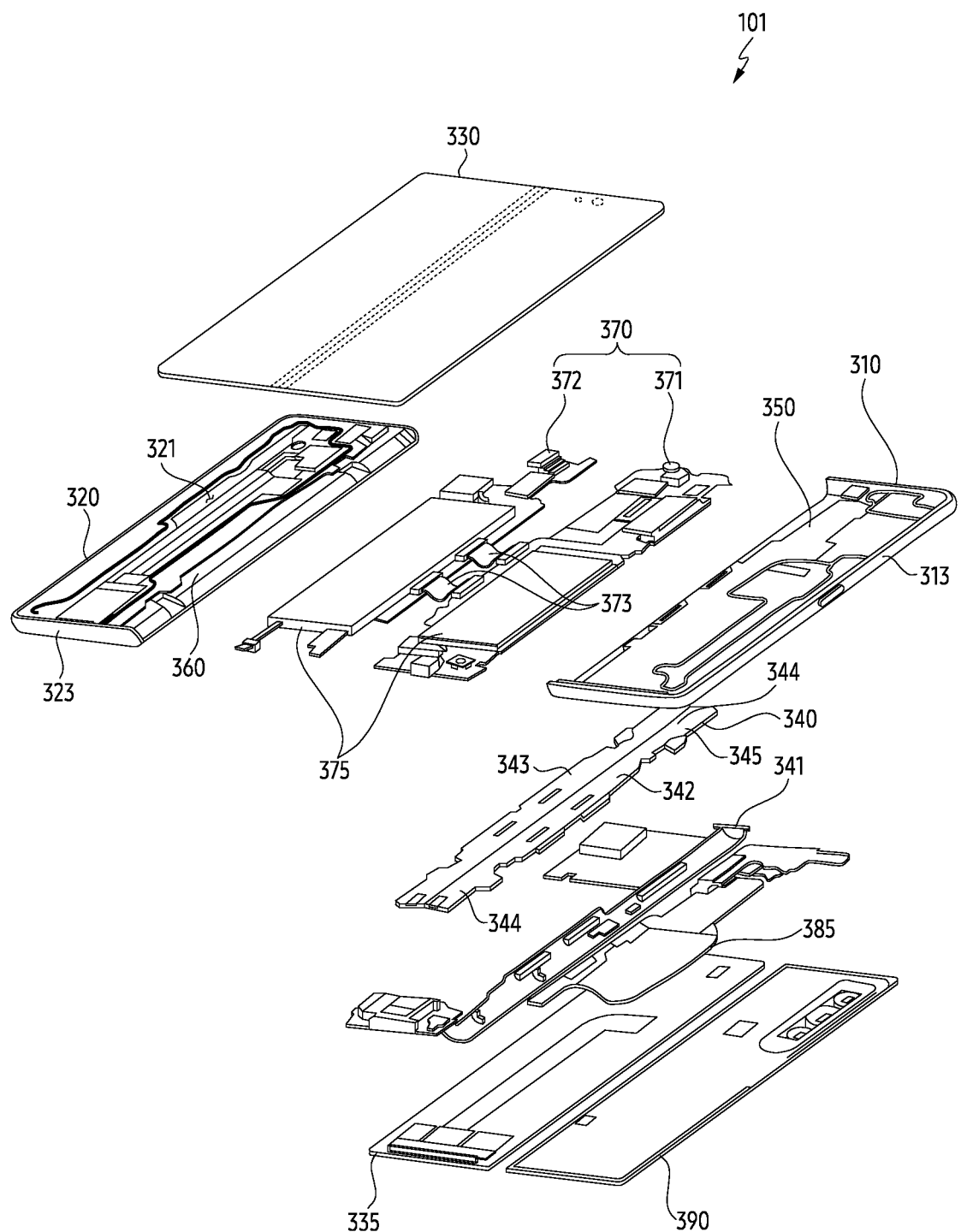
FIG. 3C is an exploded view of an electronic device according to an embodiment.

FIG. 3A illustrates an example of an unfolding state of an electronic device according to an embodiment, FIG. 3B illustrates an example of a folding state of an electronic device according to an embodiment, and FIG. 3C is an exploded view of an electronic device according to an embodiment.

Referring to FIGS. 3A, 3B, and 3C, an electronic device 101 may include a first housing 310, a second housing 320, a flexible display panel 330, and a hinge structure 340.

In an embodiment, the first housing 310 may include a first surface 311, a second surface 312 opposite to the first surface 311 and spaced apart from the first surface 311, and a first side surface 313 surrounding at least a part of the first surface 311 and the second surface 312. In an embodiment, the second surface 312 may include at least one camera 334 exposed through a part of the second surface 312. In an embodiment, the first housing 310 may provide a space formed by the first surface 311, the second surface 312, and the first side surface 313 as a space for mounting a part of components of the electronic device 101.

In an embodiment, the second housing 320 may include a third surface 321, a fourth surface 322 opposite to the third surface 321 and spaced apart from the third surface 321, and a second side surface 323 surrounding at least a part of the third surface 321 and the fourth surface 322. In an embodiment, the second housing 320 may provide a space formed by the third surface 321, the fourth surface 322, and the second side surface 323 surrounding at least a part of the third surface 321 and the fourth surface 322 as a space for mounting another part of components of the electronic device 101. In an embodiment, the fourth surface 322 may further include a display panel 335 disposed on the fourth surface 322. According to an embodiment, the camera 326 may be disposed on the fourth surface 322 and inside the second housing 320 so as to obtain an external image through the fourth surface 322. The camera 326 may be disposed under the display panel 335 to be covered by the display panel 335. In an embodiment, the camera 326 may be disposed under the display panel 335, and the display panel 335 may include an opening that is aligned with the lens of the camera 326 and transmits light from the outside to the camera 326.

In an embodiment, the flexible display panel 330 may include a window exposed to the outside. The window may protect a surface of the flexible display panel 330 and may be formed of a transparent member to transmit a visual information provided from the flexible display panel 330 to the outside. The window may include a glass material such as ultra-thin glass (UTG) or a polymer material such as polyimide (PI). In an embodiment, the flexible display panel 330 may be disposed on the first surface 311 of the first housing 310 and the third surface 321 of the second housing 320 across the hinge cover 341. The flexible display panel 330 may include a first display area 331 disposed on the first surface 311 of the first housing, a second display area 332 disposed on the third surface 321 of the second housing, and a third display area 333 between the first display area 331 and the second display area 332. The first display area 331, the second display area 332, and the third display area 333 may form a front surface of the flexible display panel 330.

According to an embodiment, an opening may be formed in a part of the screen display area of the flexible display panel 330, or a recess or an opening may be formed in a support member (e.g., a bracket) supporting the flexible display panel 330. The electronic device 101 may include at least one of a sensor module 338 aligned with a recess or opening and a camera 336. For example, the first display area 331 may further include a camera 336 capable of obtaining an image from the outside through a part of the first display area 331 and a sensor module 338 for generating an electrical signal or data value corresponding to an external environment state. According to an embodiment, at least one of a sensor module 338, and a camera 336 may be included on a rear surface of the flexible display panel 330 corresponding to the first display area 331 or the second display area 332. For example, at least one of the camera 336 and the sensor module 338 may be disposed under the flexible display panel 330 and may be surrounded by the flexible display panel 330. At least one of the camera 336 and the sensor module 338 may be surrounded by the flexible display panel 330 and not exposed to the outside. However, it is not limited thereto, and the flexible display panel 330 may include an opening exposing the camera 336 and the sensor module 338 to the outside. In an embodiment, the flexible display panel 330 may be supported by the first support member 350 of the first housing 310 and the second support member 360 of the second housing 320.

According to an embodiment, the first side surface 313 and the second side surface 323 may include a conductive material, a non-conductive material, or a combination thereof. For example, the second side surface 323 may include a conductive member 328 and a non-conductive member 329. The conductive member 328 may include a plurality of conductive members, and the plurality of conductive members may be spaced apart from each other. The non-conductive member 329 may be disposed between a plurality of conductive members. An antenna structure may be formed by the plurality of conductive members and some or a combination thereof.

According to an embodiment, each of the first housing 310 and the second housing 320 may include each of a first protection member 314 and a second protection member 324. The first protection member 314 and the second protection member 324 may be disposed on the first surface 311 and the third surface 321 along a periphery of the flexible display panel 330. According to an embodiment, the first protection member 314 and the second protection member 324 may prevent foreign materials (e.g., dust or moisture) from being introduced through a gap between the flexible display panel 330 and the first housing 310 and the second housing 320. The first protection member 314 may be disposed along a periphery of the first display area 331, and the second protection member 324 may be disposed along a periphery of the second display area 332. The first protection member 314 may be formed by being attached to the first side surface 313 of the first housing 310 or may be integrally formed with the first side surface 313. The second protection member 324 may be formed by being attached to the second side surface 323 of the second housing 320, or may be integrally formed with the second side surface 323.

According to an embodiment, the hinge structure 340 may rotatably connect the first housing 310 and the second housing 320. For example, the hinge structure 340 may be disposed between the first housing 310 and the second housing 320 of the electronic device 101 so that the electronic device 101 may be bent, curved, or folded. The hinge structure 340 may convert the electronic device 101 into an unfolding state in which the directions toward the first surface 311 of the first housing 310 and the third surface 321 of the second housing 320 are the same, or a folding state in which the first surface 311 and the third surface 321 face each other. When the electronic device 101 is in a folding state, the first housing 310 and the second housing 320 may be laid over or overlapped by facing each other.

According to an embodiment, the electronic device 101 may be foldable based on a folding axis 337. The folding axis 337 may refer to a virtual line extending through the hinge cover 341 in a direction (e.g., +y axis direction or −y axis direction of FIG. 3A) parallel to a longitudinal direction of the electronic device 101, but is not limited thereto. For example, the folding axis 337 may be a virtual line extending in a direction (e.g., +x-axis direction or −x-axis direction in FIG. 3A) perpendicular to the longitudinal direction of the electronic device 101. When the folding axis 337 extends in a direction perpendicular to the longitudinal direction of the electronic device 101, the hinge structure 340 may extend in a direction parallel to the folding axis 337 to connect the first housing 310 and the second housing 320. The first housing 310 and the second housing 320 may be rotatable by a hinge structure 340 extending in a direction perpendicular to a longitudinal direction of the electronic device 101.

According to an embodiment, the hinge structure 340 may include a hinge cover 341, a first hinge plate 342, a second hinge plate 343, and a hinge module 344.

The hinge cover 341 may surround the internal components of the hinge structure 340 and form an outer surface of the hinge structure 340. According to an embodiment, when the electronic device 101 is in a folding state, at least a part of the hinge cover 341 surrounding the hinge structure 340 may be exposed to the outside of the electronic device 101 through between the first housing 310 and the second housing 320. According to another embodiment, when the electronic device 101 is in an unfolding state, the hinge cover 341 may not be exposed to the outside of the electronic device 101 by being covered by the first housing 310 and the second housing 320.

The first hinge plate 342 and the second hinge plate 343 may rotatably connect the first housing 310 and the second housing 320 by being coupled to the first housing 310 and the second housing 320, respectively. For example, the first hinge plate 342 may be coupled to the first support member 350 of the first housing 310, and the second hinge plate 343 may be coupled to the second support member 360 of the second housing 320. As the first hinge plate 342 and the second hinge plate 343 are coupled to the first support member 350 and the second support member 360 respectively, the first housing 310 and the second housing 320 may be rotatable according to rotation of the first hinge plate 342 and the second hinge plate 343.

The hinge module 344 may rotate the first hinge plate 342 and the second hinge plate 343. For example, the hinge module 344 may rotate the first hinge plate 342 and the second hinge plate 343 based on the folding axis 337 by including by a hinge gear 345 that is rotatable by engaged with each other. According to an embodiment, the number of hinge modules 344 may be a plurality. Each of a plurality of hinge modules 344 may be disposed at both ends of the first hinge plate 342 and the second hinge plate 343.

According to an embodiment, the electronic device 101 may further include a first support member 350 and a second support member 360. The first support member 350 and the second support member 360 may be disposed on the first housing 310 and the second housing 320, respectively, to support the flexible display panel 330. For example, one surface of the first support member 350 may be coupled to the flexible display panel 330, and another surface of the first support member 350 may be coupled to the rear plate 390. For another example, one surface of the second support member 360 may be coupled to the flexible display panel 330, and another surface of the second support member 360 may be coupled to the display panel 335.

According to an embodiment, the first support member 350 may be partially surrounded by the first side surface 313, and the second support member 360 may be partially surrounded by the second side surface 323. For example, the first support member 350 may be integrally formed with the first side surface 313, and the second support member 360 may be integrally formed with the second side surface 323. As another example, the first support member 350 may be formed separately from the first side surface 313, and the second support member 360 may be formed separately from the second side surface 323. According to an embodiment, the first side surface 313 and the second side surface 323 may be formed of a metal material, a non-metal material, or a combination thereof, and may be used as an antenna.

According to an embodiment, a printed circuit board 370 and a battery 375 may be disposed between a surface formed by the first support member 350 and the second support member 360 and a surface formed by the display panel 335 and the rear plate 390. The printed circuit board 370 may be separated to be disposed on each of the first support member 350 of the first housing 310 and the second support member 360 of the second housing 320. According to an embodiment, the printed circuit board 370 may include a first printed circuit board 371 disposed on the first support member 350, a second printed circuit board 372 disposed on the second support member 360, and a flexible printed circuit board 373 electrically connecting the first printed circuit board 371 and the second printed circuit board 372. The shapes of the first printed circuit board 371 and the second printed circuit board 372 may be different depending on the inner space of the electronic device. The first printed circuit board 371 and the second printed circuit board 372 may mount components for implementing various functions of the electronic device 101. According to an embodiment, components for implementing the overall function of the electronic device 101 may be mounted on the first printed circuit board 371, electronic components for implementing some functions of the first printed circuit board 371 may be disposed on the second printed circuit board 372, or components for driving the display panel 335 disposed on the fourth surface 322 may be disposed.

The battery 375 is, for example, a device for supplying power to at least one component of the electronic device 101, and may include, for example, a non-rechargeable primary battery, a rechargeable secondary battery, or a fuel battery. At least a part of the battery 375 may be disposed on substantially the same plane as the printed circuit board 370. A surface of the printed circuit board 370 and the battery 375 formed as substantially the same plane may be disposed on one surface (e.g., a surface facing the second surface 312 and the fourth surface 322, or a surface facing the display panel 335 and the rear plate 390) of the first support member 350 and the second support member 360. For example, the flexible display panel 330 may be disposed on the first surface 311 and the third surface 321, and the printed circuit board 370 and the battery 375 may be disposed on the second surface 312 and the fourth surface 322 facing the surface where the flexible display panel 330 is disposed.

In an embodiment, the antenna 385 may be disposed between the rear plate 390 and the battery 375. The antenna 385 may include, for example, a near field communication (NFC) antenna, a wireless charging antenna, and/or a magnetic secure transmission (MST) antenna. For example, the antenna 385 may perform short-range communication with an external device or wirelessly transmit and receive power required for charging.

Figure 4A:
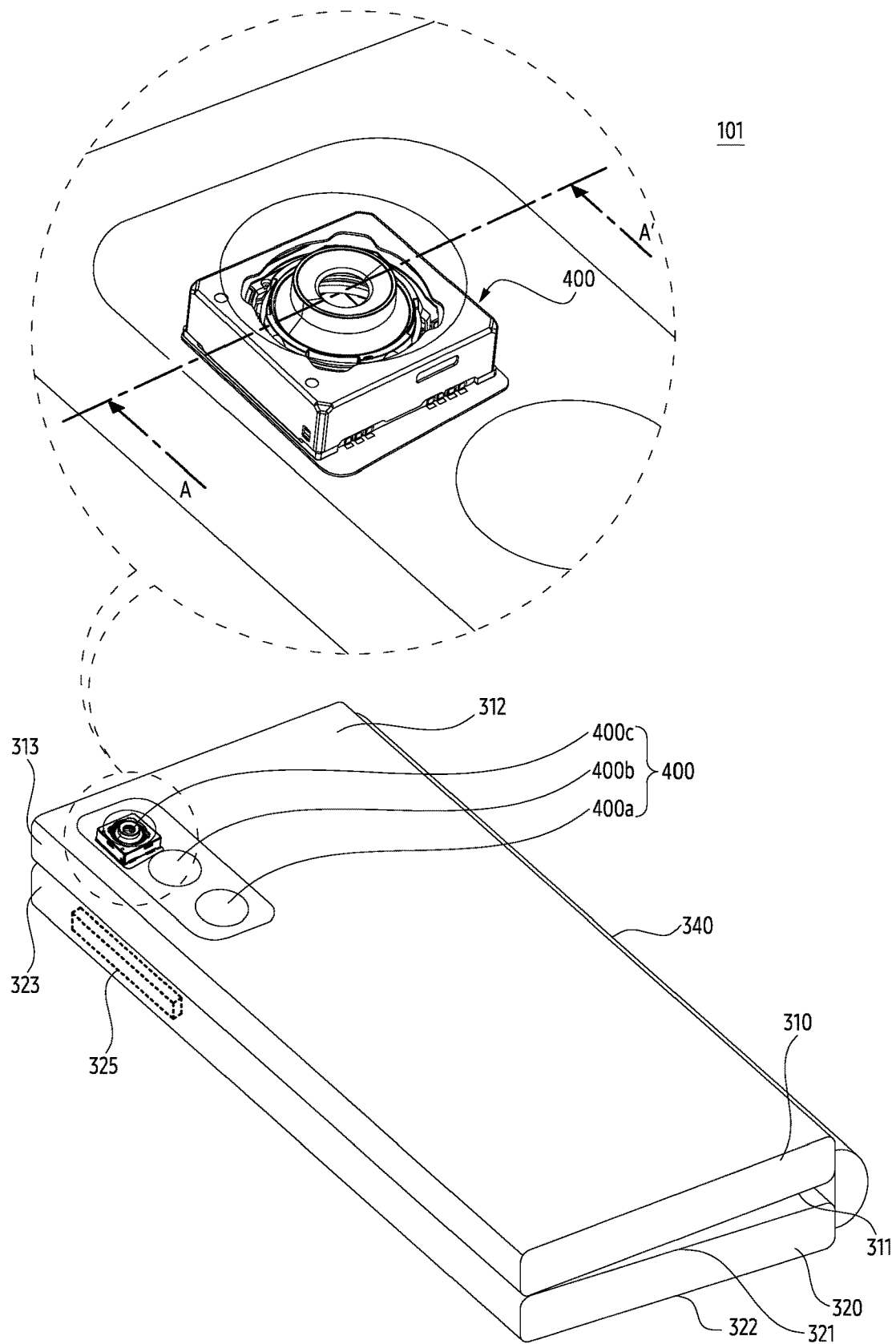
FIG. 4A illustrates an example of an electronic device according to an embodiment.
Figure 4B:
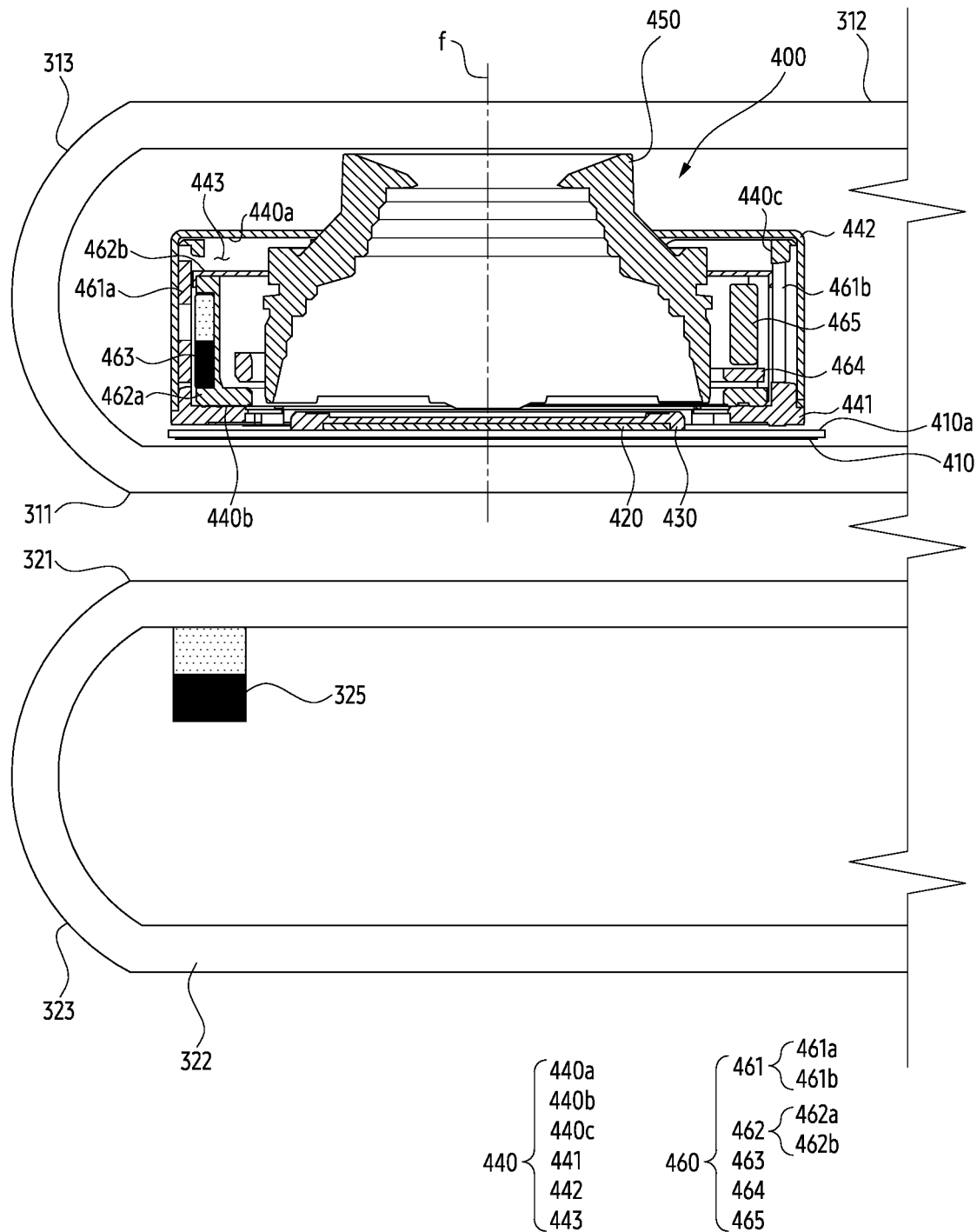
FIG. 4B is a cross-sectional view illustrating an example in which an electronic device is cut along line A-A' of FIG. 4A according to an embodiment.

FIG. 4A illustrates an example of an electronic device according to an embodiment, and FIG. 4B is a cross-sectional view illustrating an example in which an electronic device is cut along line A-A' of FIG. 4A according to an embodiment.

Referring to FIGS. 4A and 4B, the electronic device 101 according to an embodiment may include a first housing 310, a second housing 320, a hinge structure 340, a first magnet 325, and a camera module 400 (e.g., the camera module 180 of FIG. 1). The first housing 310, the second housing 320, and the hinge structure 340 of FIGS. 4A and/or 4B may be substantially the same as the first housing 310, the second housing 320, and the hinge structure 340 of FIGS. 3A, 3B, and/or 3C, respectively, and thus repeated descriptions thereof will be omitted.

According to an embodiment, the hinge structure 340 may rotatably connect the first housing 310 and the second housing 320. For example, the hinge structure 340 may convert the electronic device 101 to an unfolding state in which a direction toward the first surface 311 and a direction toward the third surface 321 are substantially the same or a folding state in which the first surface 311 and the third surface 321 face each other.

The first magnet 325 may be disposed in the second housing 320. According to an embodiment, the first magnet 325 may be disposed to face the camera module 400 in the first housing 310 when the electronic device 101 is in a folding state. The camera module 400 may include a plurality of cameras 400a, 400b, and 400c. The first magnet 325 may be disposed in the second housing 320 to face at least one of a plurality of cameras 400a, 400b, and 400c. For example, the first magnet 325 may face one of a plurality of cameras 400a, 400b, and 400c. For another example, the first magnet 325 may have a length corresponding to a plurality of cameras 400a, 400b, and 400c in the second housing 320 so as to face all of the cameras 400a, 400b, and According to an embodiment, when the electronic device 101 is viewed from the outside, the first magnet 325 may be disposed in the second housing 320 so that at least a part thereof overlaps the camera module 400. For example, when the electronic device 101 is viewed from the outside, only a part of the first magnet 325 may overlap the camera module 400 by being disposed in the second housing 320 such that a spaced-apart distance between the first magnet 325 and the second side surface 323 is shorter than a spaced-apart distance between the camera module 400 and the first side surface 313. For another example, when the electronic device 101 is viewed from the outside, the first magnet 325 may overlap the camera module 400 by being disposed in the second housing 320 such that a spaced-apart distance between the first magnet 325 and the second side surface 323 is longer than a spaced-apart distance between the camera module 400 and the first side surface 313. For another example, when the electronic device 101 is viewed from the outside, the first magnet 325 may be disposed in the second housing 320 so that the entirety of the first magnet 325 overlaps the camera module 400. According to an embodiment, the polarity of the first magnet 325 may be arranged along a direction from the fourth surface 322 toward the third surface 321. For example, the first magnet 325 may be disposed in the second housing 320 such that the N pole faces the third surface 321 and the S pole faces the fourth surface 322. As another example, the first magnet 325 may be disposed in the second housing 320 such that the N pole faces the fourth surface 322 and the S pole faces the third surface 321.

The camera module 400 may obtain an image by receiving light emitted from a subject located outside the electronic device 101. According to an embodiment, the camera module 400 may be disposed in the first housing 310 of the electronic device 101. For example, the camera module 400 may be disposed in the first housing 310 such that the optical axis f is parallel to a direction from the first surface 311 to the second surface 312 or a direction from the second surface 312 to the first surface 311. For example, the direction of the optical axis f of the camera module 400 may be perpendicular to the first surface 311 or the second surface 312. According to an embodiment, the electronic device 101 may include a plurality of cameras 400a, 400b, and 400c having different attributes or functions. For example, a plurality of cameras 400a, 400b, and 400c may be one of a wide-angle camera, an ultra-wide-angle camera, and a telephoto camera.

According to an embodiment, the camera module 400 may include a printed circuit board 410, an image sensor 420 (e.g., the image sensor 230 of FIG. 2), an optical filter 430, a case 440, a lens assembly 450 (e.g., the lens assembly 210 of FIG. 2), and an actuator 460.

The printed circuit board 410 may form an electrical connection between various components composing the camera module 400. According to an embodiment, the printed circuit board 410 may include a plurality of layers on which conductive patterns are printed. A part of the conductive patterns may be a signal line forming an electrical circuit between various components of the camera module 400 or a ground line forming a ground of the printed circuit board 410.

The image sensor 420 may receive light from the lens assembly 450 and generate an electrical signal for image generation based on the received light. According to an embodiment, the image sensor 420 may be disposed on one surface 410*a* of the printed circuit board 410. For example, the image sensor 420 may include a charge coupled device (CCD) or a complementary metal oxide semiconductor (CMOS).

The optical filter 430 may selectively filter light having a specific wavelength to transmit the filtered light to the image sensor 420. For example, since infrared rays passing through the lens assembly 450 may cause chromatic aberration and resolution degradation, the optical filter 430 may be an infrared blocking filter that prevents infrared transmission to the image sensor 420. According to an embodiment, the optical filter 430 may be interposed between the lens assembly 450 and the image sensor 420 to cover the image sensor 420.

The case 440 may form an overall outer surface of the camera module 400 and protect components of the camera module 400. According to an embodiment, the case 440 may include a first case 441 disposed on one surface 410*a* of the printed circuit board 410 and a second case 442 surrounding a part of the first case 441 and coupled to the first case 441. The first case 441 and the second case 442 may be coupled to form an inner space 443 of the case 440. According to an embodiment, the case 440 may include an outer surface surrounded by the inner surface of the first housing 310 and an inner surfaces 440*a*, 440*b* and 440*c* surrounding the inner space 443. According to an embodiment, the inner surface of the case 440 may include the surface 440*a* facing the first surface 311, another surface 440*b* spaced apart from the one surface 440*a* and facing the second surface 312, and inner surface 440*c* connecting one surface 440*a* and the another surface 440*b*. For example, the one surface 440*a* of the case 440 may mean an inner surface of the second case 442 facing the first surface 311 of the first housing 310, and the another surface 440*b* of the case 440 may mean an inner surface of the first case 441 facing the second surface 312 of the first housing 310. According to an embodiment, the direction from the another surface 440*b* of the case 440*b* to the one surface 440*a* may be substantially the same as the direction from the first surface 311 to the second surface 312. For example, the one surface 440*a* of the case 440 may be spaced apart from the another surface 440*b* of the case 440 in a direction toward the second surface 312 along the optical axis f of the camera module 400.

According to an embodiment, the second case 442 may be a shield which can surround the actuator 460 of the camera module 400. When the second case 442 is a shield, the second case 442 may prevent an external electromagnetic wave of the camera module 400 from being transferred to the camera module 400, or an electromagnetic wave by an operation of the actuator 460 from being transferred to the outside of the camera module 400, by being electrically connected to the ground line of the printed circuit board 410. For example, the second case 442 may shield the electromagnetic wave generated when the actuator 460 is operated, thereby preventing the electromagnetic wave generated by the actuator 460 from affecting other electronic components of the electronic device 101. For another example, the second case 442 may prevent the electromagnetic wave emitted by other electronic components (e.g., the antenna module 197 of FIG. 1) of the electronic device 101 from interfering with the operation of the actuator 460. For example, the second case 442 may be made of a metal material such as copper or aluminum, or a composite material in which a filler (e.g., carbon fiber that is polymer material, carbon black, carbon nanotube (CNT), or nickel coated graphite) is added to a metal material.

The lens assembly 450 may collect light transmitted from an external subject of the camera module 400. According to an embodiment, the lens assembly 450 may be disposed on the printed circuit board 410 to be movable within the case 440. For example, the lens assembly 450 may move along the optical axis f (e.g., direction from the other side 440*b* of the case 440 to one side 440*a* or from one side 440*a* of the case 440 to the other side 440*b*) of the camera module 400 (i.e., z axis direction). For another example, the lens assembly 450 may move in a direction perpendicular to the optical axis f of the camera module 400 (e.g., a direction the inner surface 440*c* faces).

The actuator 460 may provide a driving force to the lens assembly 450 so that the lens assembly 450 may move. According to an embodiment, the actuator 460 may include a coil 461, a first carrier 462, a second magnet 463, a second carrier 464, and a third magnet 465.

According to an embodiment, the coil 461 may be fixed to the inner surface 440*c* of the case 440. A current transmitted from the printed circuit board 410 may flow along the inside of the coil 461. For example, the coil 461 may have a shape in which an electric wire is wound around a direction substantially perpendicular to the optical axis f direction of the camera module 400, but is not limited thereto. According to an embodiment, the coil 461 may include a plurality of coils 461*a* and 461*b* corresponding to each of the first carrier 462 and the second carrier 464. A plurality of coils 461*a* and 461*b* may interact with a second magnet 463 and a third magnet 465 accommodated in the first carrier 462 and the second carrier 464, respectively.

According to an embodiment, the first carrier 462 may implement an auto focusing (AF) function of the camera module 400 by moving the lens assembly 450 along the optical axis f of the camera module 400. According to an embodiment, the first carrier 462 may include a first holder 462*a* that accommodates the second magnet 463 and faces the another surface 440*b* of the case 440, and a second holder 462*b* facing one surface 440*a* of the case 440, and surrounding a part of the first holder 462*a*. Since the second holder 462*b* is disposed to surround the first holder 462*a*, the first carrier 462 and the second carrier 464 may be protected by the second holder 462*b*. The first holder 462*a* and the second holder 462*b* may be coupled to form the first carrier 462 and may move in a direction toward the one surface 440*a* of the case 440 or the another surface 440*b* in a coupled state.

According to an embodiment, the second magnet 463 may be accommodated in the first carrier 462 such that polarity is arranged in a direction from one surface 440*a* of the case 440 to the another surface 440*b*. For example, the second magnet 463 may be accommodated in the first carrier 462 such that the N pole faces one surface 440*a* of the case 440 and the S pole faces the another surface 440*b* of the case 440. For another example, the second magnet 463 may be accommodated in the first carrier 462 such that the N pole faces the another surface 440*b* of the case 440 and the S pole faces the one surface 440*a* of the case 440. According to an embodiment, when a current is applied to the coil 461, the first carrier 462 may move in a direction toward one surface 440*a* of the case 440 or in a direction toward the another surface 440b of the case 440 by the Lorentz force generated as the coil 461 and the second magnet 463 interact. As the first carrier 462 moves, the lens assembly 450 coupled to the first carrier 462 may move together with the first carrier 462.

According to an embodiment, the second carrier 464 may implement an optical image stabilization (OIS) function of the camera module 400 by moving the lens assembly 450 in a direction (e.g., x axis direction or y axis direction) substantially perpendicular to the optical axis f of the camera module 400. The second carrier 464 may be accommodated in the first carrier 462 and may move relatively to the first carrier 462. According to an embodiment, the second carrier 464 may accommodate the third magnet 465. The third magnet 465 may be arranged along a direction in which the polarity is substantially perpendicular to the direction from one side 440a of the case 440 to the other side 440b. According to an embodiment, when a current is applied to the coil 461b, the second carrier 464 may move on a plane substantially perpendicular to the optical axis f of the camera module 400 as the coil 461 and the third magnet 465 interact. The coil 461b may function as a solenoid as current is applied, and may act an attractive or repulsive force against the third magnet 465. The second carrier 464 coupled to the third magnet 465 may move on a plane substantially perpendicular to the optical axis f of the camera module 400 as attraction or repulsion is applied to the third magnet 465. For example, the second carrier 464 may move in a direction toward the inner surface 440c of the case 440 on the inner space 443. As the second carrier 464 moves in a direction toward the inner surface 440c of the case 440, the lens assembly 450 coupled to the second carrier 464 may move together with the second carrier 464.

According to an embodiment, when the electronic device 101 is in a folding state, the first magnet 325 may limit movement of the lens assembly 450 of the camera module 400 by interacting with the second magnet 463. For example, the polarity of a part of the first magnet 325 may be the same as that of the second magnet 463 facing a part of the first magnet 325. When the polarities facing each other are the same, the first magnet 325 may move the first carrier 462 in a direction toward the one surface 440a of the case 440 by applying a repulsive force to the second magnet 463. The first carrier 462 may move in a direction toward the one surface 440a of the case 440 and be in contact with the one surface 440a of the case 440, such that a position thereof may be fixed. For another example, the polarity of a part of the first magnet 325 may be different from that of the second magnet 463 facing a part of the first magnet 325. When polarities facing each other are different, the first magnet 325 may move the first carrier 462 in a direction toward the another surface 440b of the case 440 by applying attraction to the second magnet 463. The first carrier 462 moves in a direction toward the another surface 440b of the case 440, and comes into contact with the another surface 440b of the case 440, such that the position thereof may be fixed.

For example, when the user does not use the photography function of the electronic device 101, power may not be applied to the camera module 400. Since current does not flow in the coil 461 when power is not applied to the camera module 400, the first carrier 462 may move in the case 440 together with the lens assembly 450 by gravity or movement of the electronic device 101. When the first carrier 462 and the lens assembly 450 move in the case 440, the first carrier 462 and the lens assembly 450 collide with the inner surfaces 440a, 440b, and 440c of the case 440, and thus vibration or noise may occur, and components of the camera module 400 may be damaged. When a current is continuously supplied to the coil 461 to prevent movement of the first carrier 462 or the lens assembly 450, power may need to be continuously supplied from the battery (e.g., the battery 189 of FIG. 1) to the camera module 400, even when the user is not using the photography function. When power is continuously supplied to the camera module 400, power of the battery 189 is wasted and the charging cycle of the electronic device 101 is shortened, which may cause the user to feel uncomfortable. According to an embodiment, since movements of the first carrier 462 and the lens assembly 450 is restricted by interacting the first magnet 325 and the second magnet 463, the electronic device 101 may prevent vibration or noise from being generated in the camera module 400 without consuming power of the battery 189. The electronic device 101 according to an embodiment is prevented from generating vibration or noise in the camera module 400, and thus components of the camera module 400 are prevented from being damaged, thereby increasing a life.

According to an embodiment, the first magnet 325 may maintain the folding state of the electronic device 101 by being disposed to face the camera module 400 when the electronic device 101 is in the folding state. For example, since the polarity of a part of the first magnet 325 is different from that of the second magnet 463 facing a part of the first magnet 325, the first magnet 325 may act an attractive force on the second magnet 463. When the first magnet 325 and the second magnet 463 act as attractive forces, the first surface 311 and the third surface 321 are maintained to face each other, so that the folding state of the electronic device 101 may be maintained. The first magnet 325 maintains the folding state of the electronic device 101 to prevent the electronic device 101 from being converted to the unfolding state when the user does not want it.

According to an embodiment as described above, when the electronic device 101 is in the folding state, the electronic device 101 may limit movement of the first carrier 462 and the lens assembly 450 in the camera module 400 without consuming power by interacting with the first magnet 325 of the second housing 320 and the second magnet 463 in the camera module 400. The electronic device 101 according to an embodiment may prevent generation of vibration or noise in the camera module 400 and prevent damage to components of the camera module 400 by limiting movement of the first carrier 462 and the lens assembly 450. The electronic device 101 according to an embodiment may prevent the first magnet 325 from being converted to the unfolding state when the user does not want it by maintaining the folding state of the electronic device 101.

Figure 5A:
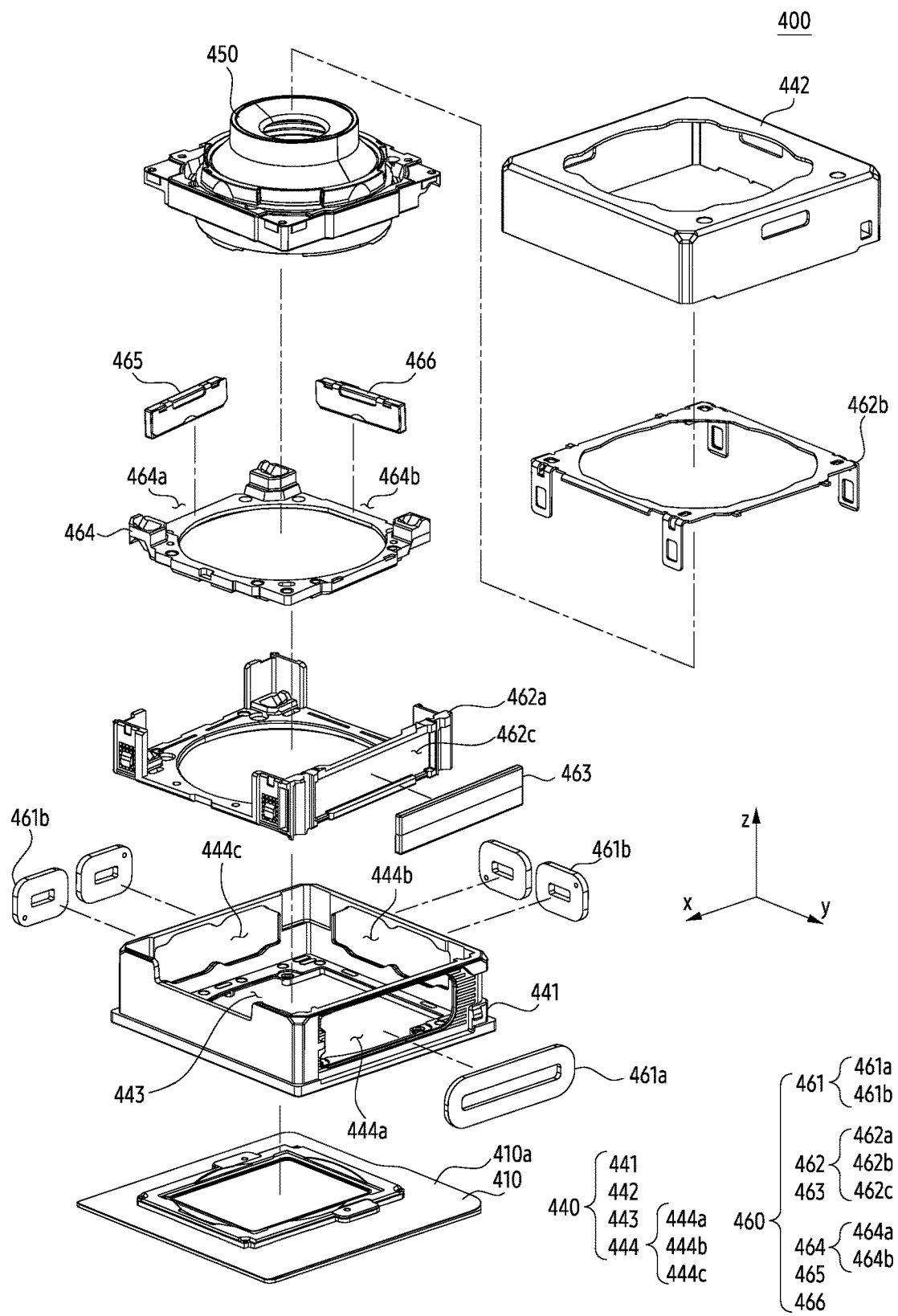
FIG. 5A is an exploded perspective view of a camera module disposed on an electronic device according to an embodiment.
Figure 5B:
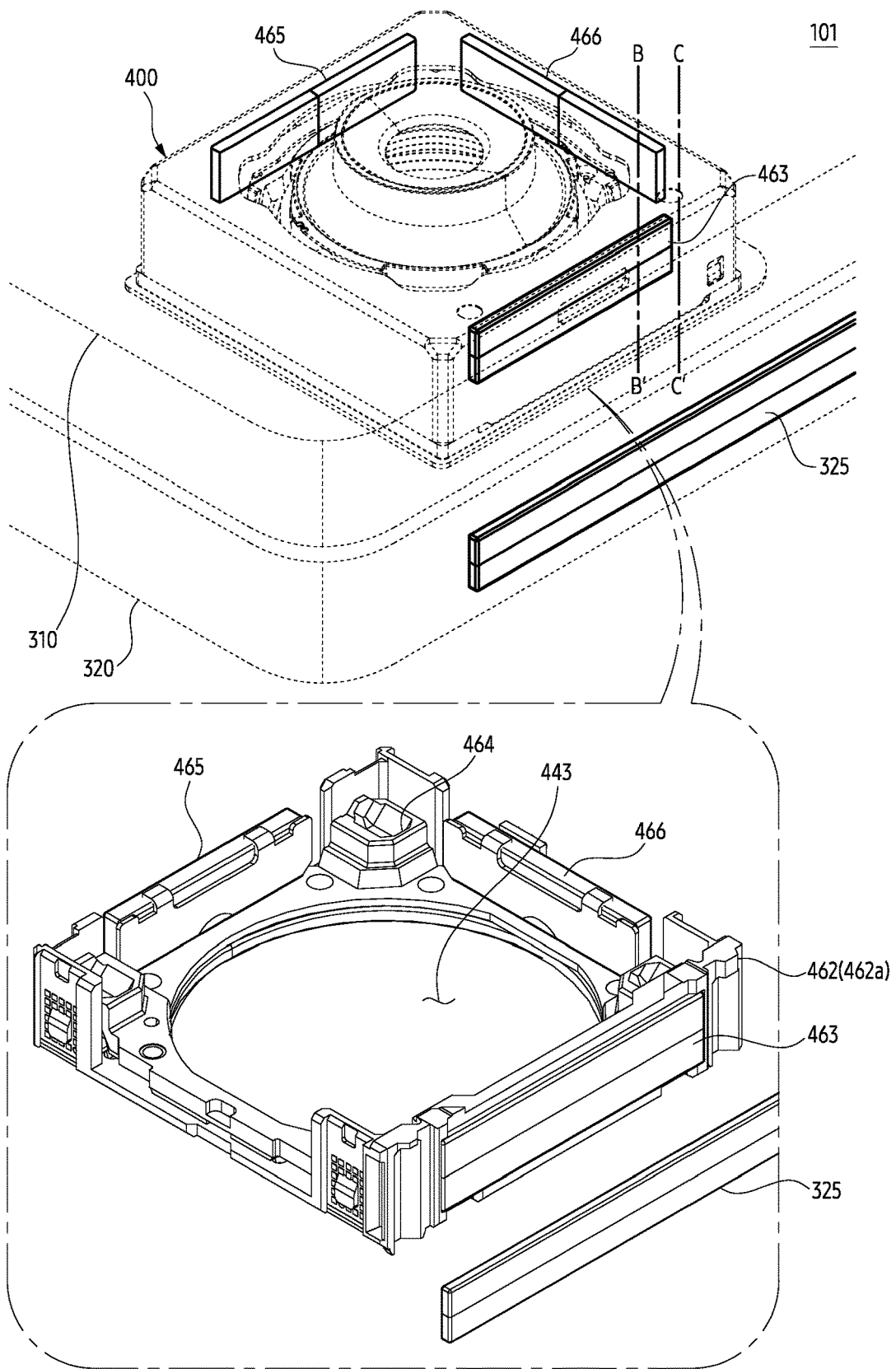
FIG. 5B is a perspective view of an electronic device according to an embodiment.

FIG. 5A is an exploded perspective view of a camera module disposed on an electronic device according to an embodiment, and FIG. 5B is a perspective view of an electronic device according to an embodiment.

Referring to FIGS. 5A and 5B, according to an embodiment, the first case 441, the first holder 462a, the second carrier 464, the lens assembly 450, the second holder 462b, and the second case 442 of the camera module 400 may be sequentially arranged along an optical axis (e.g., the +z axis direction or the −z axis direction of FIG. 5A). For example, the first holder 462a may be accommodated in the inner space 443 of the first case 441. The second carrier 464 may be disposed on the first holder 462a so that at least a part thereof is surrounded by the first holder 462a. The lens assembly 450 may be coupled on the second carrier 464. The second holder 462b may surround a part of the second carrier 464 and the first holder 462a, and may be coupled to the first holder 462a. The coupled first holder 462a and second holder 462b may form a first carrier 462. The second case 442 may surround the first carrier 462 and the second carrier 464 and may be coupled to the first case 441. The first case 441 and the second case 442 may be coupled to each other to form an inner space 443. In a state where the first case 441 and the second case 442 are coupled, a part of the lens assembly 450 may be exposed to the outside of the second case 442.

According to an embodiment, the actuator 460 of the camera module 400 may further include a fourth magnet 466. The fourth magnet 466 may move the lens assembly 450 in a direction substantially perpendicular to the optical axis of the camera module 400 by being accommodated in the second carrier 464 and interacting with the coil 461. For example, the fourth magnet 466 may move the lens assembly 450 in a direction (e.g., the −x axis direction or the +x axis direction in FIG. 5A) substantially perpendicular to a direction (e.g., the −y axis direction or the +y axis direction in FIG. 5A) in which the optical axis (e.g., +z axis direction or −z axis direction in FIG. 5A) of the camera module 400 and the third magnet 465 move the lens assembly 450.

According to an embodiment, the first case 441 may be disposed on one surface 410a of the printed circuit board 410. The first case 441 may include a coupling groove 444 in which the coil 461 is accommodated. The coupling groove 444 may be formed by perforating a side surface of the first case 441 so that the outside of the first case 441 and the inner space 443 are connected. The coupling groove 444 may be plural to correspond to the number of magnets 463, 465, and 466 included in the first carrier 462 and the second carrier 464. For example, a first part 444a of the plurality of coupling grooves 444a, 444b, and 444c may correspond to the second magnet 463, a second part 444b may correspond to the fourth magnet 466, and a third part 444c may correspond to the third magnet 465. According to an embodiment, the plurality of coupling grooves 444a, 444b, and 444c may surround the inner space 443 of the first case 441.

According to an embodiment, the first holder 462a of the first carrier 462 may include a coupling groove 462c to which the second magnet 463 is coupled. The second magnet 463 may be accommodated inside the coupling groove 462c to move together with the first carrier 462 according to the movement of the first carrier 462.

According to an embodiment, the second carrier 464 may include a first holding groove 464a and a second holding groove 464b in which the third magnet 465 and the fourth magnet 466 are accommodated. The third magnet 465 and the fourth magnet 466 may be accommodated in the first holding groove 464a and the second holding groove 464b, respectively, and thus may move together with the second carrier 464 according to the movement of the second carrier 464.

Referring to FIG. 5B, according to an embodiment, in a state in which the camera module 400 is assembled, the second magnet 463, the third magnet 465, and the fourth magnet 466 may surround the inner space 443 and may be spaced apart from each other.

According to an embodiment, the first magnet 325 may be disposed in the second housing 320 so that magnetic flux density is concentrated in the second magnet 463 when the electronic device 101 is in a folding state. For example, when the electronic device 101 is in a folding state, at least a portion of the first magnet 325 may face the second magnet 463. As the magnetic flux density of the first magnet 325 is concentrated in the second magnet 463, the first magnet 325 may act on the second magnet 463 by a force greater than a force acting on the third magnet 465 or the fourth magnet 466. As a force acts strongly on the second magnet 463, the first magnet 325 may effectively prevent the movement of the first carrier 462. For example, the movement range of the first carrier 462 moving together with the second magnet 463 may be relatively greater than the movement range of the second carrier 464 moving together with the third magnet 465 and the fourth magnet 466. When power is not applied to the camera module 400, the vibration generated by the first carrier 462 may be greater than the vibration generated in the second carrier 464, as the movement range of the first carrier 462 is greater than the movement range of the second carrier 464. According to an embodiment, when the electronic device 101 is in a folding state, the first magnet 325 faces the second magnet 463 coupled to the first carrier 462, and thus the electronic device 101 may effectively block vibration that may occur in the camera module 400.

As described above, according to an embodiment, when the electronic device 101 is in a folding state, the electronic device 101 may effectively prevent the first carrier 462 from moving by arranging the first magnet 325 in the second housing 320 so that the magnetic flux density is concentrated in the second magnet 463. According to an embodiment, the electronic device 101 may prevent the first carrier 462 from moving, thereby preventing generation of vibration or noise in the camera module 400 and preventing damage to components of the camera module 400.

Meanwhile, although not illustrated in FIG. 5B, the electronic device 101 according to an embodiment may further include magnets (not shown) corresponding to the third magnet 465 and the fourth magnet 466, respectively. For example, the electronic device 101 may include a fifth magnet disposed in the second housing 320 and interacting with the third magnet 465. For example, the electronic device 101 may include a sixth magnet disposed in the second housing 320 and interacting with the fourth magnet 466. The fifth magnet and the sixth magnet may each operate substantially the same as the first magnet 325 to prevent generation of noise in the camera module 400.

Figure 6A:
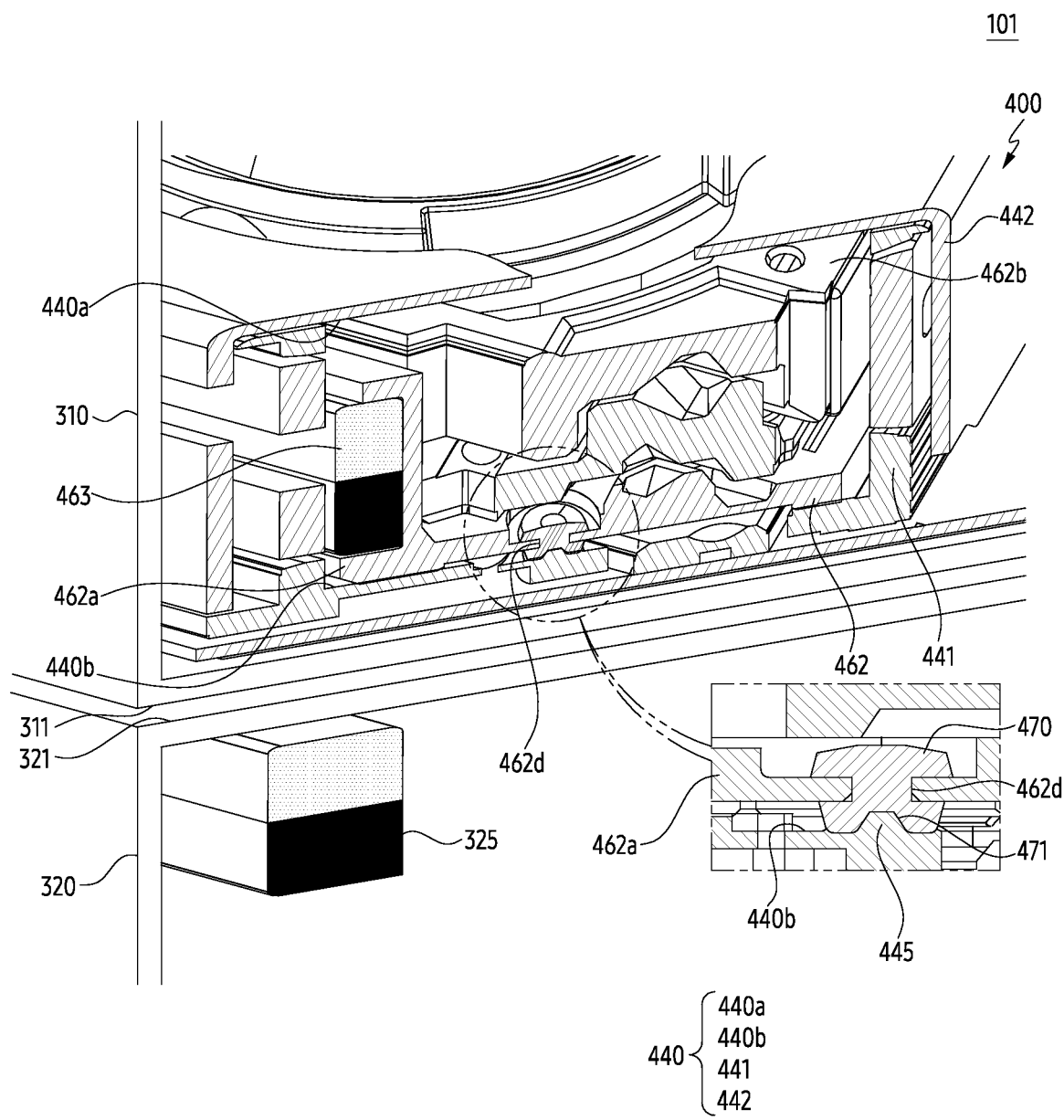
FIG. 6A is a cross-section perspective view illustrating an example in which an electronic device is cut along line B-B' of FIG. 5B according to an embodiment.
Figure 6B:
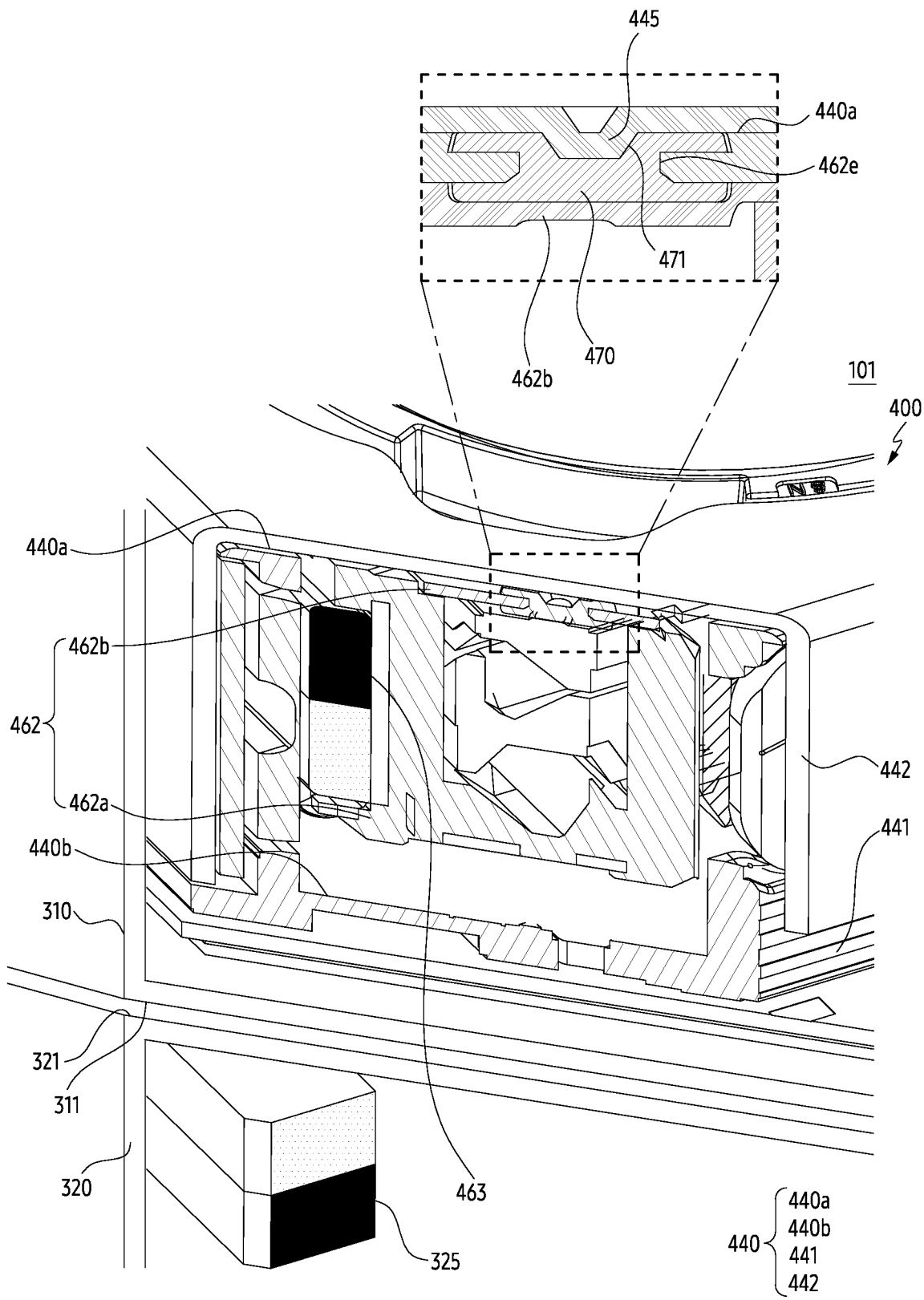
FIG. 6B is a cross-section perspective view illustrating an example in which an electronic device is cut along line C-C' of FIG. 5B according to an embodiment.

FIG. 6A is a cross-section perspective view illustrating an example in which an electronic device is cut along line B-B' of FIG. 5B according to an embodiment, and FIG. 6B is a cross-section perspective view illustrating an example in which an electronic device is cut along line C-C' of FIG. 5B according to an embodiment.

Referring to FIGS. 6A and 6B, the camera module 400 of the electronic device 101 according to an embodiment may further include a buffering member 470. The buffering member 470 may absorb a shock generated when the first carrier 462 contacts with the case 440 to prevent damage to the first carrier 462. According to an embodiment, the buffering member 470 may be made of an elastically deformable material to buffer an impact that may occur in the camera module 400. For example, the buffering member 470 may be at least one of silicon and rubber, but is not limited thereto and may be one of various elastic bodies according to Hook's law.

According to an embodiment, the buffering member 470 may be disposed on a part of the first carrier 462 facing the another surface 440b of the case 440. For example, the first holder 462a may include a first through hole 462d formed by passing through a part of the first holder 462a facing the another surface 440b of the case 440. The buffering member 470 may be inserted into the first through hole 462d, thereby passing through the first holder 462a facing the another surface 440b of the case 440, and coupled to the first carrier 462. According to an embodiment, the buffering member 470 coupled to the first holder 462a facing the another surface 440b of the case 440 may buffer an impact generated when the another surface 440b of the case 440 is in contact with the first carrier 462. For example, when a partial polarity of the second magnet 463 is different from a partial polarity of the first magnet 325 facing a part of the second magnet 463, the first magnet 325 may move the first carrier 462 in a direction toward the another surface 440b of the case 440 due to attractive force between the first magnet 325 and the second magnet 463. When the first carrier 462 contacts with the another surface 440b of the case 440, the buffering member 470 may contact the another surface 440b of the case 440 and may be deformed by the first carrier 462 and the another surface 440b of the case 440. The buffering member 470 may absorb an impact generated when the first carrier 462 and the another surface 440b of the case 440 come into contact with each other by being deformed to elastically support the first carrier 462.

According to an embodiment, the buffering member 470 may be disposed on a part of the first carrier 462 facing one surface 440a of the case 440. For example, the second holder 462b may include a second through hole 462e formed by passing through a part of the second holder 462b facing the one surface 440a of the case 440. The buffering member 470 may be inserted into the second through-hole 462e to pass through a part of the second holder 462b facing the one surface 440a of the case 440 and to be coupled to the second holder 462b. According to an embodiment, the buffering member 470 coupled to the second holder 462b facing the one surface 440a of the case 440 may buffer an impact generated when the one surface 440a of the case 440 is in contact with the first carrier 462. For example, when a partial polarity of the second magnet 463 and a partial polarity of the first magnet 325 facing a part of the second magnet 463 are the same, the first magnet 325 may move the first carrier 462 in a direction toward the first surface 440a of the case 440 due to the repulsive force between the first magnet 325 and the second magnet 463. When the first carrier 462 contacts the one surface 440a of the case 440, the buffering member 470 may contact the one surface 440a of the case 440 and may be deformed by the first carrier 462 and the one surface 440b of the case 440. The buffering member 470 may be deformed to absorb impact generated when the first carrier 462 and the one surface 440a of the case 440a contact each other, and may elastically support the first carrier 462.

According to an embodiment, the buffering member 470 may include an accommodating groove 471 formed by recessing a part of the buffering member 470 inward. For example, when the buffering member 470 is disposed on a part of the first carrier 462 facing the one surface 440a of the case 440, the accommodating groove 471 may be formed by recessing a part of the buffering member 470 facing the one surface 440a of the case 440. For another example, when the buffering member 470 is disposed on a part of the first carrier 462 facing the another surface 440b of the case 440, the accommodating groove 471 may be formed by recessing a part of the buffering member 470 facing the another surface 440b of the case 440.

According to an embodiment, the case 440 may include an accommodating protrusion 445 accommodated in the accommodating groove 471 of the buffering member 470 when the case 440 and the first carrier 462 contact each other. The accommodating protrusion 445 may be disposed in the case 440 to correspond to the accommodating groove 471 of the buffering member 470. For example, when the accommodating groove 471 faces one surface 440a of the case 440, the accommodating protrusion 445 may protrude from the one surface 440a of the case 440a. When the accommodating groove 471 faces the another surface 440b of the case 440, the accommodating protrusion 445 may protrude from the another surface 440b of the case 440. When the accommodating groove 471 and the accommodating protrusion 445 are formed in the buffering member 470 and the case 440, respectively, since the contact area between the buffering member 470 and the case 440 is increased, the buffering member 470 may effectively buffer the impact generated when the first carrier 462 and the case 440 contact each other.

As described above, according to an embodiment, the electronic device 101 may prevent vibration or noise from being generated in the camera module 400, and may prevent components of the camera module 400 from being damaged by including a buffering member 470 for buffering the impact generated when the first carrier 462 and the case 440 contact with each other.

Figure 7:
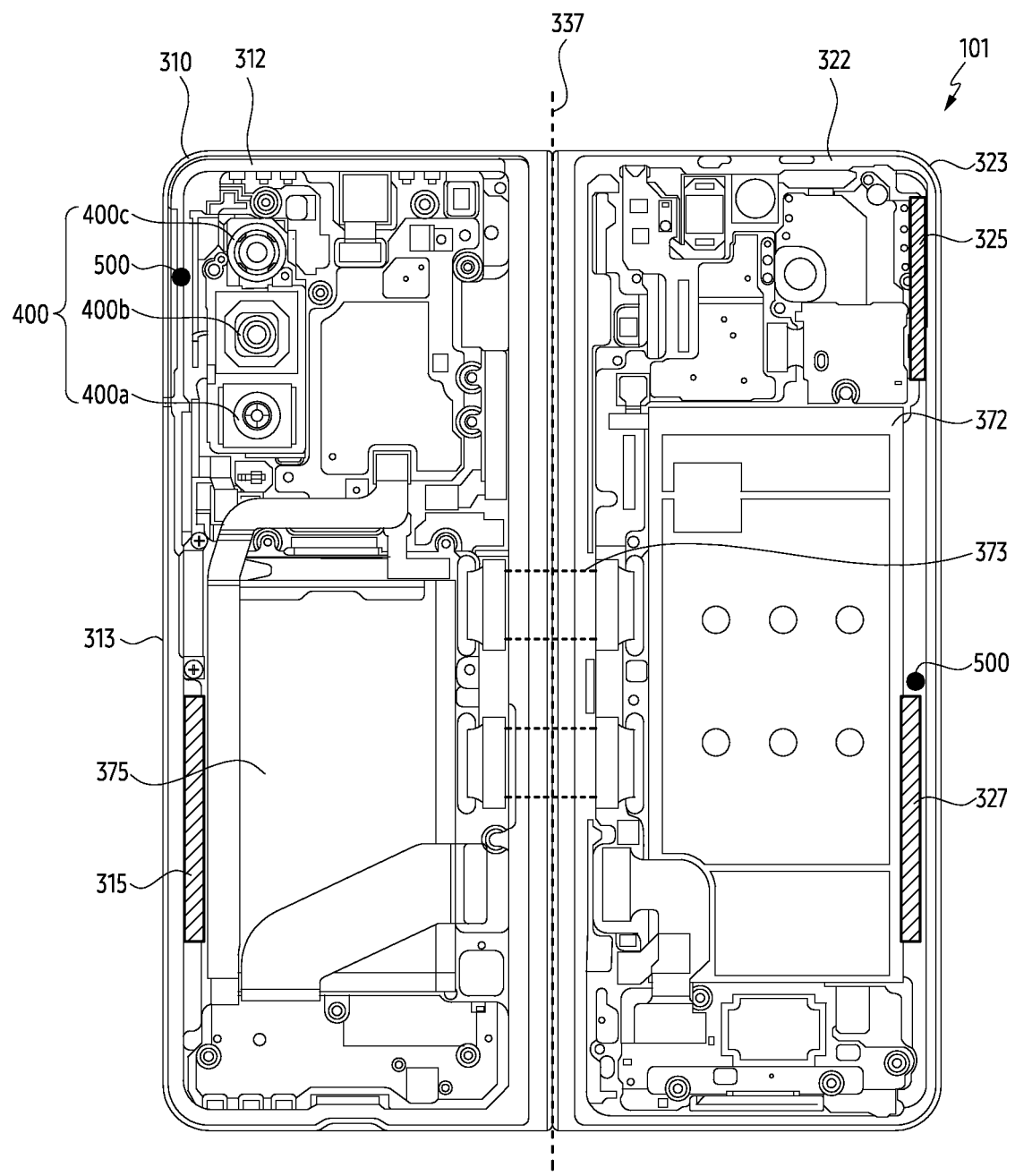
FIG. 7 is a view illustrating an example of an internal structure of an electronic device viewed from a second surface and a fourth surface when the electronic device is in an unfolding state according to an embodiment.

FIG. 7 is a view illustrating an example of an internal structure of an electronic device viewed from a second surface and a fourth surface when the electronic device is in an unfolding state according to an embodiment.

Referring to FIG. 7, in an embodiment, the first printed circuit board 371 and the battery 375 may be disposed in the first housing 310 of the electronic device 101. The first printed circuit board 371 may form an electrical connection between components of the electronic device 101 that performs the overall operation of the electronic device 101. For example, the first printed circuit board 371 may be a main circuit board of the electronic device 101 on which the processor (e.g., the processor 120 of FIG. 1) is disposed. Components of the electronic device 101 capable of performing various functions may be disposed on the first printed circuit board 371 so that the electronic device 101 may equip various functions. The first printed circuit board 371 may occupy most of the mounting space of the first housing 310 to arrange various components. The battery 375 may supply power to the first printed circuit board 371. As the electronic device 101 performs various functions, the battery 375 may occupy most of the mounting space of the first housing 310.

According to an embodiment, the camera module 400 may be disposed adjacent to the first side surface 313 of the first housing 310 to be mounted in a limited mounting space of the first housing 310. For example, the camera module 400 may be disposed at a periphery of the first side surface 313 spaced apart from the folding axis 337 and extending along the extending direction of the folding axis 337, among the first side surfaces 313. According to an embodiment, the camera module 400 may include a plurality of cameras 400a, 400b, and 400c performing different functions, and the plurality of cameras 400a, 400b, and 400c may be arranged along the extending direction of the folding axis 337.

According to an embodiment, the first magnet 325 may be disposed at a periphery of the second side surface 323 of the second housing 320 to correspond to the camera module 400 of the first housing 310. For example, the first magnet 325 may be disposed at a periphery of the second side surface 323 spaced apart from the folding axis 337 and extending along the extending direction of the folding axis 337, among the second side surface 323. Since the first magnet 325 is disposed at the periphery of the second side surface 323, the first magnet 325 may face the camera module 400 when the electronic device 101 is folding. For example, when the first magnet 325 is not disposed on the periphery of the second side surface 323, the magnetic field emitted by the first magnet 325 may affect operations of various components of the electronic device 101. According to an embodiment, since the first magnet 325 is disposed at the periphery of the second side surface 323, the electronic device 101 may minimize the influence of the first magnet 325 on various components of the electronic device 101.

According to an embodiment, when the electronic device 101 is in a folding state, the first magnet 325 may maintain the folding state of the electronic device 101 by interacting with the second magnet (e.g., the second magnet 463 of FIG. 4B) in the camera module 400.

According to an embodiment, the electronic device 101 may further include a first holding magnet 315 and a second holding magnet 327 in which the electronic device 101 maintains a folding state. For example, the first holding magnet 315 may be disposed at a periphery of the first side surface 313 of the first housing 310, and the second holding magnet 327 may be disposed at a periphery of the second side surface 323 of the second housing 320. When the electronic device 101 is in the folding state, the first holding magnet 315 and the second holding magnet 327 may exert attractive forces on each other to maintain the folding state of the electronic device 101.

According to an embodiment, the electronic device 101 may further include a sensor 500 (e.g., a hall sensor or a magnetic (geographic) sensor) for detecting a folding state or an unfolding state of the electronic device 101. For example, the magnetic (magnetic) sensor may measure orientation using a magnetic field and a magnetic force line, and the hall sensor may detect a direction and a magnitude of a magnetic field applied from the outside of the sensor 500 through a hall effect. The sensor 500 is disposed in the first housing 310 or the second housing 320 and may detect a folding state or an unfolding state of the electronic device 101 by using a change in a magnetic field generated as the electronic device 101 is folded or unfolded. For example, the sensor 500 may be disposed adjacent to the camera module 400 of the first housing 310 and may face the first magnet 325 when the electronic device 101 is in a folding state. As the electronic device 101 is folded, the sensor 500 may detect a change in the magnetic field due to the first magnet 325. For another example, the sensor 500 may be disposed adjacent to the second holding magnet 327 of the second housing 320 and may face the first holding magnet 315 when the electronic device 101 is in a folding state. As the electronic device 101 is folded, the sensor 500 may detect a change in the magnetic field due to the first holding magnet 315. According to another embodiment, the sensor 500 may detect a magnetic field generated from the electromagnetic derivative, and may detect various motions such as approach or movement of the electromagnetic derivative by using electromagnetic.

As described above, according to an embodiment, since the first magnet 325 is disposed at the periphery of the second side surface 323, the electronic device 101 may minimize an influence on various components in the electronic device 101. According to an embodiment, since the first magnet 325 maintains the folding state of the electronic device 101, the electronic device 101 may prevent the electronic device 101 from being converted to the unfolding state when the user does not want it.

Figure 8:
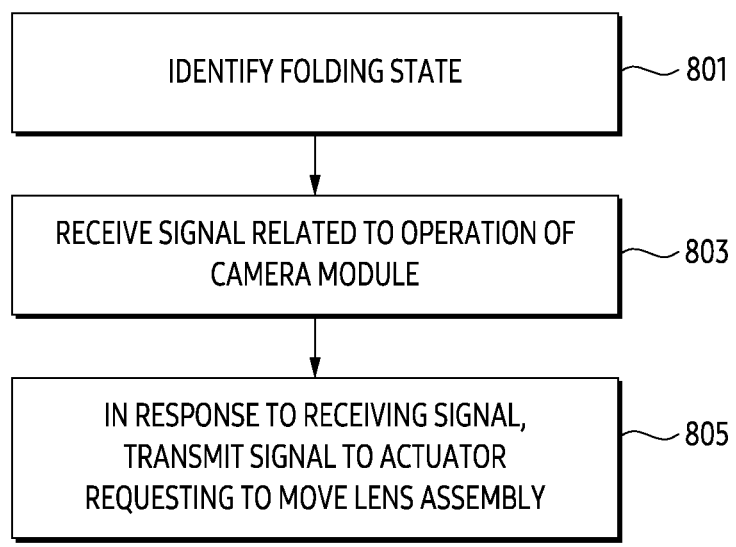
FIG. 8 illustrates an example of an operation of a processor of an electronic device, according to an embodiment.

FIG. 8 illustrates an example of an operation of a processor of an electronic device, according to an embodiment.

The operation illustrated in FIG. 8 may be performed by the electronic device 101 illustrated in FIGS. 4A and 7 (e.g., the electronic device 101 illustrated in FIGS. 4a and 7).

Referring to FIG. 8, in operation 801, the processor (e.g., the processor 120 of FIG. 1) of the electronic device 101 may identify the folding state of the electronic device 101. According to an embodiment, the processor 120 may be configured to receive sensing data from a sensor (e.g., the sensor 500 of FIG. 7) and determine whether the electronic device 101 is folded based on the received sensing data. For example, as the electronic device 101 is folded, the processor 120 may identify whether the electronic device 101 is folded based on sensing data related to the obtained intensity of the magnetic field through the sensor 500. The processor 120 may identify that the electronic device 101 is in a folding state by identifying that sensing data related to the intensity of the magnetic field obtained through sensor 500 is equal to or greater than a designated value. For example, as the intensity of the magnetic field increases, the sensor 500 may generate sensing data corresponding to the increased voltage. When the intensity of the sensing data received from the sensor 500 exceeds a designated range, the processor 120 may determine that the electronic device 101 is in a folding state.

In operation 803, when the electronic device 101 is in a folding state, the processor 120 may receive a signal related to an operation of the camera module (e.g., the camera module 400 of FIG. 4A). For example, when the resolution of the image acquired by the image sensor (e.g., image sensor 420 in FIG. 4B) is low, or focal distance and the distance between the camera module 400 and the subject are not corresponding to each other, the processor 120 may determine whether to move the lens assembly (e.g., the lens assembly 450 of FIG. 4B) of the camera module 400 based on the signal received from the image sensor 420. For another example, in response to an input related to the operation of the camera module 400 provided through a touch from an input module (e.g., input module 150 in FIG. 1) or a display module (e.g., display module 160 in FIG. 1), the processor 120 may determine whether to move the lens assembly 450 of the camera module 400.

In operation 805, in response to the reception of a signal related to the operation of the camera module 400, the processor 120 may transmit a signal requesting to move the lens assembly 450 to the actuator (e.g., the actuator 460 of FIG. 4B). According to an embodiment, in a state in which the first magnet (e.g., the first magnet 325 of FIG. 4B) and the second magnet (e.g., the second magnet 463 of FIG. 4B) interacting with each other, the actuator 460 may receive a signal from the processor 120 and move the first carrier (e.g., the first carrier 462 of FIG. 4B).

For example, when the electronic device 101 is in an unfolding state, the processor 120 may transmit a first signal requesting to move the lens assembly 450 to the actuator 460 in response to reception of a signal related to the operation of the camera module 400. The actuator 460 may receive the first signal and apply a current having a first amount of current to a coil (e.g., the coil 461 of FIG. 4B). In a state in which the first magnet 325 and the second magnet 463 do not interact with each other, the coil 461 may move the first carrier 462 as a current having a first current amount flows. For another example, when the electronic device 101 is in a folding state, the processor 120 may transmit a second signal requesting to move the lens assembly 450 to the actuator 460 in response to reception of a signal related to the operation of the camera module 400. The actuator 460 may receive the second signal and apply a current having a second current amount greater than the first current amount to the coil 461. In a state in which the first magnet 325 and the second magnet 463 are interacting, the coil 461 may move the first carrier 462 according to the flow of current having a second amount of current greater than the first current amount.

A force for moving the first carrier 462 in a state in which the first magnet 325 and the second magnet 463 are interacting may be greater than a force for moving the first carrier 462 in a state in which the first magnet 325 and the second magnet 463 are not interacting. For example, when the electronic device 101 is in a folding state, the first magnet 325 may apply an attractive force to the second magnet 463. When the first magnet 325 applies attractive force to the second magnet 463, more force may be required to move the first carrier 462 coupled to the second magnet 463 than when the electronic device 101 is in an unfolding state. According to an embodiment, in a folding state in which the first magnet 325 and the second magnet 463 interact, the processor 120 may move the first carrier 462 to implement an auto-focus (AF) function of the camera module 400 by applying the second signal to the actuator 460 so that a current having a second current amount greater than the first current amount is applied to the coil 461.

As described above, according to an embodiment, in the folding state, the processor 120 of the electronic device 101 may transmit the second signal to the actuator 460 so that a current having a larger current flows through the coil 461 than in the unfolding state. According to an embodiment, the electronic device 101 may normally operate the camera module 400 even when the first magnet 325 and the second magnet 463 interact as the second signal is transmitted to the actuator 460.

According to an embodiment, an electronic device (e.g., the electronic device 101 of FIG. 4A) may include a first housing (e.g., the first housing 310 of FIG. 4A) including a first surface (e.g., the first surface 311 of FIG. 4A) and a second surface (e.g., the second surface 312 of FIG. 4A) opposite to the first surface and spaced apart from the first surface; a second housing (e.g., the second housing 320 of FIG. 4A) including a third surface (e.g., the third surface 321 of FIG. 4A) and a fourth surface (e.g., the fourth surface 322 of FIG. 4A) opposite to the third surface and spaced apart from the third surface; a hinge structure (e.g., the hinge structure 340 of FIG. 4A) transformable to an unfolding state in which a direction in which the first surface faces and a direction in which the third surface faces are the same or to a folding state in which the first surface faces the third surface, by rotatably connecting the first housing and the second housing; a camera module (e.g., the camera module 400 of FIG. 4A) disposed within the first housing; and a first magnet (e.g., the first magnet 325 of FIG. 4A) disposed within the second housing and facing the camera module when the electronic is in the folding state; wherein the camera module may include a case (e.g., case 440 in FIG. 4B) including one surface (e.g., one surface 440a of the case 440 of FIG. 4B) facing the first surface and another surface (e.g., the another surface 440b of the case 440 of FIG. 4B) facing the second surface and spaced apart from the first surface; a lens assembly (e.g., the lens assembly 450 of FIG. 4B) movable within the case; and an actuator (e.g., actuator 460 in FIG. 4B) accommodating a second magnet (e.g., the second magnet 463 of FIG. 4B) and including a first carrier (e.g., the first carrier 462 of FIG. 4B) configured to move the lens assembly in a direction toward the one surface of the case or a direction toward the another surface of the case; wherein the first magnet may limit the movement of the lens assembly by interaction with the second magnet when the electronic device is in the folding state.

According to an embodiment, the first carrier may move in the direction toward the one surface within the case by the first magnet and contacts with the one surface within the case, when the electronic device is in the folding state.

According to an embodiment, the first carrier may move in the direction toward the another surface within the case by the first magnet to contact with the another surface within the case, when the electronic device is in the folding state.

According to an embodiment, the first magnet may maintain the folding state of the electronic device by interacting with the second magnet.

According to an embodiment, the electronic device may further include: a first holding magnet (e.g., the first holding magnet 315 of FIG. 7) disposed within the first housing and spaced apart from the camera module; and a second holding magnet (e.g., the second holding magnet 327 of FIG. 7) disposed within the second housing and spaced apart from the first magnet, wherein the second holding magnet is configured to maintain the folding state of the electronic device by interacting with the first holding magnet when the electronic device is in the folding state.

According to an embodiment, the actuator may further include a second carrier (e.g., the second carrier 464 of FIG. 4B) distinct from the first carrier, configured to accommodate the third magnet (e.g., the third magnet 465 of FIG. 4B), and move the lens assembly in a direction perpendicular to a direction from the one surface of the case to the another surface of the case.

According to an embodiment, the second housing may include a side surface (e.g., the second side surface 323 of FIG. 4B) surrounding the third surface and the fourth surface to connect the third surface and the fourth surface, and the first magnet may be disposed on the periphery of the side surface.

According to an embodiment, an electronic device may further comprise a processor (e.g., the processor 120 in FIG. 1) operatively coupled to the actuator, and the processor may be configured to receive a signal regarding an operation of the camera module when the electronic device is in the folding state, and in response to receiving the signal, transmit a signal to the actuator requesting to move the lens assembly.

According to an embodiment, the camera module may be provided in a plurality, and the first magnet may be disposed within the second housing to face at least one camera module among the plurality of camera modules when the electronic device is in the folding state.

According to an embodiment, the camera module may further include a buffering member (e.g., the buffering member 470 of FIGS. 6A and 6B) configured to elastically support the carrier when the carrier and the case come into contact.

According to an embodiment, the buffering member may be disposed on a part (e.g., the second holder 462b of FIGS. 6A and 6B) of the carrier facing the one surface of the case.

According to an embodiment, the buffering member may be disposed on a part (e.g., the first holder 462a of FIGS. 6A and 6B) of the carrier facing the another surface of the case.

According to an embodiment, the buffering member may include an accommodating groove (e.g., the accommodating groove 471 of FIGS. 6A and 6B) formed by a part of the buffering member dented inwardly, and the case may further include an accommodating protrusion (e.g., the accommodating protrusion 445 of FIGS. 6A and 6B) accommodated in the accommodating groove when the case is in contact with the carrier.

According to an embodiment, an electronic device (e.g., the electronic device 101 of FIG. 4A) may include a first housing (e.g., the first housing 310 of FIG. 4A) including a first surface (e.g., the first surface 311 of FIG. 4A) and a second surface (e.g., the second surface 312 of FIG. 4A)

opposite to the first surface and spaced apart from the first surface; a second housing (e.g., the second housing 320 of FIG. 4A) including a third surface (e.g., the third surface 321 of FIG. 4A) and a fourth surface (e.g., the fourth surface 322 of FIG. 4A) opposite to the third surface and spaced apart from the third surface; a hinge structure (e.g., the hinge structure 340 of FIG. 4A) transformable to an unfolding state in which a direction in which the first surface face and a direction in which the third surface faces are the same or a folding state in which the first surface faces the third surface, by rotatably connecting the first housing and the second housing; a camera module (e.g., the camera module 400 of FIG. 4A) disposed within the first housing; and a first magnet (e.g., the first magnet 325 of FIG. 4A) disposed within the second housing and facing the camera module when the electronic is in the folding state. The camera module may include a case (e.g., case 440 in FIG. 4B) including one surface (e.g., one surface 440a of the case 440 of FIG. 4B) facing the first surface and another surface (e.g., the another surface 440b of the case 440 of FIG. 4B) facing the second surface and spaced apart from the first surface; a lens assembly (e.g., the lens assembly 450 of FIG. 4B) movable within the case; and an actuator (e.g., actuator 460 in FIG. 4B) including a first carrier (e.g., the first carrier 462 of FIG. 4B) accommodating a second magnet and configured to move the lens assembly in a direction toward the one surface of the case or a direction toward the another surface of the case, and a second carrier (e.g., the second carrier 464 of FIG. 4B) accommodating a third magnet (e.g., the third magnet 465 of FIG. 4B) and configured to move the lens assembly in a direction perpendicular to a direction from the one surface to the another surface; and where the first magnet may face the second magnet and limit the movement of the lens assembly by interacting with the second magnet when the electronic device is in the folding state.

According to an embodiment, the first carrier may move in the direction toward the one surface within the case by the first magnet and in contact with the one surface within the case, when the electronic device is in the folding state.

According to an embodiment, the first magnet may maintain the folding state of the electronic device by interacting with the second magnet.

According to an embodiment, the electronic device may further include: a first holding magnet (e.g., the first fixing magnet 315 of FIG. 7) disposed within the first housing and spaced apart from the camera module; and a second holding magnet (e.g., the second holding magnet 327 of FIG. 7) disposed within the second housing and spaced apart from the first magnet, wherein the second holding magnet is configured to maintain the folding state of the electronic device by interacting with the first holding magnet when the electronic device is in the folding state.

According to an embodiment, the second housing may include a side surface (e.g., the second side surface 323 of FIG. 4B) surrounding the third surface and the fourth surface to connect the third surface and the fourth surface, and the first magnet may be disposed on the periphery of the side surface.

According to an embodiment, the processor (e.g., the processor 120 in FIG. 1) may be configured to receive a signal regarding an operation of the camera module when the electronic device is in the folding state, in response to receiving the signal, transmit a signal to the actuator requesting to move the lens assembly.

According to an embodiment, the camera module may include a buffering member (e.g., the buffering member 470 of FIGS. 6A and 6B) configured to elastically support the first carrier when the first carrier and the case is in contact with the carrier.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a first housing including a first surface and a second surface opposite to the first surface and spaced apart from the first surface;
   a second housing including a third surface and a fourth surface opposite to the third surface and spaced apart from the third surface;
   a hinge structure transformable to an unfolding state in which a direction in which the first surface faces and a direction in which the third surface faces are the same or to a folding state in which the first surface faces the third surface, by rotatably connecting the first housing and the second housing;
   a camera module disposed within the first housing; and
   a first magnet disposed within the second housing and facing the camera module when the electronic is in the folding state,
   wherein the camera module includes:
      a case including one surface facing the first surface and another surface facing the second surface and spaced apart from the first surface;
      a lens assembly movable within the case; and
      an actuator accommodating a second magnet and including a first carrier configured to move the lens assembly in a direction toward the one surface of the case or a direction toward the another surface of the case; and
   wherein the first magnet limits the movement of the lens assembly by interaction with the second magnet when the electronic device is in the folding state.

2. The electronic device of claim 1, wherein the first carrier moves in the direction toward the one surface within the case by the first magnet and in contact with the one surface within the case, when the electronic device is in the folding state.

3. The electronic device of claim 1, wherein the first carrier moves in the direction toward the another surface within the case by the first magnet and in contact with the another surface within the case, when the electronic device is in the folding state.

4. The electronic device of claim 1, wherein the first magnet maintains the folding state of the electronic device by interacting with the second magnet.

5. The electronic device of claim 1, further comprising:
   a first holding magnet disposed within the first housing and spaced apart from the camera module; and
   a second holding magnet disposed within the second housing and spaced apart from the first magnet,
   wherein the second holding magnet is configured to maintain the folding state of the electronic device by interacting with the first holding magnet when the electronic device is in the folding state.

6. The electronic device of claim 1, wherein the actuator further includes a second carrier distinct from the first carrier, and configured to move the lens assembly in a direction perpendicular to a direction from the one surface of the case to the another surface of the case.

7. The electronic device of claim 1,
   wherein the second housing further includes a side surface surrounding the third surface and the fourth surface to connect the third surface and the fourth surface, and
   wherein the first magnet is disposed on the periphery of the side surface.

8. The electronic device of claim 1, further comprising a processor operatively coupled to the actuator,
   wherein the processor is configured to:
   receive a signal regarding an operation of the camera module when the electronic device is in the folding state, and
   in response to receiving the signal, transmit a signal to the actuator requesting to move the lens assembly.

9. The electronic device of claim 1,
   wherein the camera module is provided in a plurality, and
   wherein the first magnet is disposed within the second housing to face at least one camera module among the plurality of camera modules when the electronic device is in the folding state.

10. The electronic device of claim 1, wherein the camera module further includes a buffering member configured to elastically support the carrier when the carrier and the case come into contact.

11. The electronic device of claim 10, wherein the buffering member is disposed on a part of the carrier facing the one surface of the case.

12. The electronic device of claim 10, wherein the buffering member is disposed on a part of the carrier facing the another surface of the case.

13. The electronic device of claim 10,
   wherein, the buffering member includes an accommodating groove formed by a part of the buffering member dented inwardly, and
   wherein the case further includes an accommodating protrusion accommodated in the accommodating groove when the case is in contact with the carrier.

14. The electronic device of claim 1, further comprising:
a sensor; and
a processor operably coupled to the sensor;
wherein the processor is configured to:
obtain data related to a change of magnetic field by the first magnet; and
identify a state of the electronic device base on the obtained data.

15. The electronic device of claim 14,
wherein the processor is configured to:
based on identifying that the state of the electronic device is the unfolding state, apply a current having a first current amount to a coil of the actuator; and
based on identifying that the state of the electronic device is the folding state, apply a current having a second current amount larger than the first current amount to the coil of the actuator.

16. An electronic device comprising:
a first housing including a first surface and a second surface opposite to the first surface and spaced apart from the first surface;
a second housing including a third surface and a fourth surface opposite to the third surface and spaced apart from the third surface;
a hinge structure transformable to an unfolding state in which a direction in which the first surface face and a direction in which the third surface faces are the same or to a folding state in which the first surface faces the third surface, by rotatably connecting the first housing and the second housing;
a camera module disposed within the first housing; and
a first magnet disposed within the second housing and facing the camera module when the electronic is in the folding state,
wherein the camera module includes:
  a case including one surface facing the first surface and another surface facing the second surface and spaced apart from the first surface;
  a lens assembly movable within the case; and
  an actuator including a first carrier accommodating a second magnet and configured to move the lens assembly in a direction toward the one surface of the case or a direction toward the another surface of the case, and a second carrier accommodating a third magnet and configured to move the lens assembly in a direction perpendicular to a direction from the one surface to another surface, and
wherein the first magnet faces the second magnet and limits the movement of the lens assembly by interacting with the second magnet when the electronic device is in the folding state.

17. The electronic device of claim 16, wherein the first carrier moves in the direction toward the one surface within the case by the first magnet and in contact with the one surface within the case, when the electronic device is in the folding state.

18. The electronic device of claim 16, wherein the first magnet maintains the folding state of the electronic device by interacting with the second magnet.

19. The electronic device of claim 16, further comprising:
a first holding magnet disposed within the first housing and spaced apart from the camera module; and
a second holding magnet disposed within the second housing and spaced apart from the first magnet, wherein the second holding magnet is configured to maintain the folding state of the electronic device by interacting with the first holding magnet when the electronic device is in the folding state.

20. The electronic device of claim 16, further comprising a processor operatively coupled to the actuator,
wherein the processor is configured to:
receive a signal regarding an operation of the camera module when the electronic device is in the folding state, and
in response to receiving the signal, transmit a signal to the actuator requesting to move the lens assembly.

* * * * *